(12) United States Patent
Gil

(10) Patent No.: US 9,435,999 B2
(45) Date of Patent: Sep. 6, 2016

(54) DEVICE FOR ADJUSTING CURVATURE OF MIRROR WHILE AVOIDING MOVEMENT OF CENTRAL POINT OF MIRROR, AND MIRROR ADJUSTMENT SYSTEM COMPRISING SAME

(75) Inventor: Kye Hwan Gil, Pohang-si (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 296 days.

(21) Appl. No.: 14/008,570

(22) PCT Filed: Feb. 22, 2012

(86) PCT No.: PCT/KR2012/001350
§ 371 (c)(1),
(2), (4) Date: Sep. 30, 2013

(87) PCT Pub. No.: WO2012/121499
PCT Pub. Date: Sep. 13, 2012

(65) Prior Publication Data
US 2014/0049850 A1 Feb. 20, 2014

(30) Foreign Application Priority Data

Mar. 8, 2011 (KR) .......................... 10-2011-0020364
Apr. 26, 2011 (KR) .......................... 10-2011-0039126

(51) Int. Cl.
  G02B 26/08 (2006.01)
  G02B 7/185 (2006.01)
  G02B 7/188 (2006.01)

(52) U.S. Cl.
  CPC ........... *G02B 26/0825* (2013.01); *G02B 7/185* (2013.01); *G02B 7/188* (2013.01); *G21K 2201/06* (2013.01); *G21K 2201/067* (2013.01)

(58) Field of Classification Search
  USPC ................. 250/503.1, 504 R; 315/500–507; 126/569, 683–703; 385/900; 359/846, 359/847, 868; 353/3; 355/67
  See application file for complete search history.

(56) References Cited

U.S. PATENT DOCUMENTS 5,784,925 A 7/1998 Trost et al.
2008/0165402 A1* 7/2008 Nakamura et al. ... B81B 3/0021
359/198.1

FOREIGN PATENT DOCUMENTS

JP 57-135037 A 8/1982
JP 07-294699 A 11/1995
(Continued)

OTHER PUBLICATIONS

Zhang et al., "Design Optimization of a Flexural Hinge-Based Bender for X-Ray Optics", Journal of Synchrotron Radiation, vol. 5 (1998), pp. 804-807.*

(Continued)

*Primary Examiner* — Stephone B Allen
*Assistant Examiner* — Ryan Dunning
(74) *Attorney, Agent, or Firm* — Revolution IP, PLLC

(57) ABSTRACT

Disclosed is a device for adjusting the curvature of a mirror comprising: a base block; a pair of rotating blocks which are connected to the base block by one or more elastic bodies, respectively, and rotate around the connection portions between the base block and the elastic bodies or elastically return to through the application or release of external forces; a pair of support blocks which are disposed at the pair of rotating blocks, respectively, to support both ends of the mirror and apply bending moments to the both ends of the mirror by the rotation of the pair of rotating blocks; and a driving part for rotating the pair of rotating blocks.

15 Claims, 11 Drawing Sheets

(56) References Cited

FOREIGN PATENT DOCUMENTS

| JP | 11-162807 A | 6/1999 |
|---|---|---|
| KR | 10-2003-0063660 A | 7/2003 |

OTHER PUBLICATIONS

Dabin et al., "The Present State of Kirkpatrick-Baez Mirror Systems at the ERSF", Proceedings of SPIE, vol. 4782 (2002), pp. 235-245.*

* cited by examiner

DEVICE FOR ADJUSTING CURVATURE OF MIRROR WHILE AVOIDING MOVEMENT OF CENTRAL POINT OF MIRROR, AND MIRROR ADJUSTMENT SYSTEM COMPRISING SAME

CROSS REFERENCE TO PRIOR APPLICATIONS

This application is a National Stage Application of PCT International Patent Application No. PCT/KR2012/001350 filed on Feb. 22, 2012, under 35 U.S.C. §371, which claims priority to Korean Patent Application Nos. 10-2011-0020364 filed on Mar. 8, 2011 and 10-2011-0039126 filed on Apr. 26, 2011, which are all hereby incorporated by reference in their entirety.

TECHNICAL FIELD

The present invention relates to a device for adjusting the curvature of a mirror and a mirror adjustment system including the same, and more particularly, to a device for adjusting the curvature of a mirror, which can easily perform mirror adjustment processes including processes for adjusting the position, angle, and curvature of a mirror and further improve the accuracy and reliability of the device, and a mirror adjustment system including the same.

BACKGROUND ART

Generally, a synchrotron radiation accelerator, in which electrons are accelerated at almost the speed of light and then rotated by using electromagnets to generate electromagnetic waves having high brightness in a wide energy range, such as ultraviolet rays, X-rays, etc., includes mirrors for focusing synchrotron radiation and mirror adjustment systems for adjusting the positions, angles, and curvatures of the mirrors.

A conventional mirror adjustment system includes a position adjustment device for adjusting the position of the mirror, an angle adjustment device for adjusting the angle of the mirror, and a curvature adjustment device for adjusting the curvature of the mirror. Among these devices, the conventional curvature adjustment device for adjusting the curvature of the mirror is illustrated in FIGS. 1 to 3.

The conventional curvature adjustment device includes a base block 20, a pair of rotating blocks 30 each being rotatably connected to the base block 20 as a cantilever 31, a pair of support blocks 40 respectively fixed to the pair of rotating blocks 30 to support both ends of a mirror 10, and a pair of driving parts 50 applying external forces to the pair of rotating blocks 30 to rotate the pair of rotating blocks 30.

In the conventional curvature adjustment device, as shown in FIG. 3, the pair of rotating blocks 30 rotate toward the mirror 10 with respect to each rotating point by applying the external forces by the pair of driving parts 50 constituted by the first and second leaf springs 51 and 52 and a driver 53. When the applied external force is released, each of the pair of rotating blocks 30 returns to its original position by the elastic force of the cantilever 31.

Here, when the pair of rotating blocks 30 rotate, the pair of support blocks 40 apply bending moments to both ends of the mirror 10. As a result, the mirror 10 is adjusted so that the mirror 10 is bent to increase the curvature thereof. That is, in the conventional curvature adjustment device, the pair of driving parts 50 may adequately control the magnitude of the external force applied to each of the pair of rotating blocks 30 to adjust the curvature of the mirror 10 to a desired value.

The process for adjusting the mirror 10 by using the conventional mirror adjustment system including the curvature adjustment device is largely classified into a process in which the mirror 10 is adjusted in position and angle so that electromagnetic waves are incident onto the central point MC of the mirror 10 and a process in which the mirror 10 is adjusted in pitch angle and curvature to focus the electromagnetic waves reflected from the mirror 10.

In the process for adjusting the mirror 10, when the process for focusing the electromagnetic waves reflected from the mirror 10 is performed using the conventional mirror adjustment system, a total of three input variables with respect to the driver for adjusting the pitch angle of the mirror 10 and the pair of driving parts 50 for adjusting the curvature of the mirror 10 should be adjusted. Thus, the process may be complicated and inconvenient.

Also, in the curvature adjustment device provided in the conventional mirror adjustment system, as shown in FIG. 3, as the bending moments are applied to both ends of the mirror 10, the center of the mirror 10 moves downward, thereby changing the curvature of the mirror 10. Thus, as the mirror 10 is slightly or largely adjusted in curvature in the process for adjusting the curvature of the mirror 10, the central point MC of the mirror 10 onto which the electromagnetic waves are incident may be moved upward or downward in position when viewed in FIG. 3.

As described above, when the mirror 10 is adjusted by using the mirror adjustment system including the conventional curvature adjustment device when the curvature of the mirror 10 is largely adjusted to largely move the central point MC of the mirror 10, the process for adjusting the position and angle of the mirror, which is previously performed so that the electromagnetic waves are incident onto the central point MC, should be performed again.

Furthermore, as the processes for adjusting the position, angle, and curvature of the mirror are complicated in consideration that the intensity of electromagnetic waves passing after the electromagnetic waves are incident onto the mirror 10 is measured, or the stepwise intensity of electromagnetic waves reflected after the electromagnetic waves are incident onto the mirror 10 is measured while precisely scanning the reflected electromagnetic waves, to calculate a position adjustment value, angle adjustment value, and curvature adjustment value on the basis of the measured values, thereby reflecting the adjustment values, this problem is not a small disadvantage.

Also, in the conventional curvature adjustment device, the pair of support blocks 40 supporting both ends of the mirror 10 together with the mirror 10 may constitute an assembly and then be fixed as-is to the pair of rotating blocks 30. Thus, when the assembly of the pair of support blocks 40 and the mirror 10 has a length that does not accurately correspond to a corresponding length of the pair of rotating blocks 30, the mirror 10 may be bent unintentionally. Thus, the reliability of the device may be deteriorated due to the bending of the mirror 10.

That is, for example, in a case where the assembly of the pair of support blocks and the mirror 10 has a length greater than a corresponding length of the pair of rotating blocks 30, when the assembly is attached over the pair of rotating blocks 30, both sides of the mirror 10 may be pressed to cause the bending of the mirror 10.

DISCLOSURE OF THE INVENTION

Technical Problem

To solve the above-described problems, the present invention provides a device for adjusting the curvature of a mirror in which the central point of the mirror is fixed in position without being moved when the curvature of the mirror is adjusted, the unintentional bending of the mirror while the mirror is installed is prevented, and the process of adjusting the curvature of the mirror may be performed by adjusting an input with respect to only one driver, and a mirror adjustment system including the same.

Technical Solution

An object of the present invention is to provide a device for adjusting the curvature of a mirror by applying a bending moments to both ends of the mirror or releasing the bending moments, the device including: a base block; a pair of rotating blocks which are connected to the base block through at least one first elastic body, each of the pair of rotating blocks being rotated around a connection portion between the base block and the first elastic body or elastically returning to its original position through the application or release of an external force; a pair of support blocks which are respectively disposed on the pair of rotating blocks to support both ends of the mirror, the pair of support blocks applying bending moments to both ends of the mirror by the rotation of the pair of rotating blocks; and a driving part rotating the pair of rotating blocks, wherein the first elastic body connects the rotating blocks to the base block so that the support points of the support blocks of the mirror are movable in a direction opposite to the moving direction of the central point of the mirror by a change in the curvature as the rotating blocks are rotated.

The first elastic body may have a cantilever shape and is perpendicular to the reflection surface of the mirror which is disposed in an opening formed in a side of the base block, and when viewed from a front side, a first rotating point that is a connection portion between the base block and the first elastic body may be disposed on the reflection surface of the mirror or at a position adjacent to the reflection surface of the mirror.

The rotating blocks and the first elastic body may be integrated with the base block.

At least one of the pair of support blocks may be disposed on the rotating blocks through a connecting block fixed to be adjustable in position to the rotating blocks.

The driving part may include: a first leaf spring provided in a pair to rotate each of the pair of rotating blocks, the first leaf spring having one end fixed to the rotating blocks; a second leaf spring disposed through a connecting member so that the second leaf spring is fixed to the other end of the first leaf spring in a state where the second leaf spring is spaced a predetermined distance from the first leaf spring and disposed parallel to the first leaf spring; and a driver pressing or releasing the other end of the second leaf spring toward the first leaf spring.

Another object of the present invention is to provide a device for adjusting the curvature of a mirror by applying bending moments to both ends of the mirror or releasing the bending moments, the device including: a base block; a pair of rotating blocks which are connected to the base block through at least one first elastic body, each of the pair of rotating blocks being rotated around a connection portion between the base block and the first elastic body or elastically returning to its original position through the application or release of an external force; a pair of support blocks which are respectively disposed on the pair of rotating blocks to support both ends of the mirror, the pair of support blocks applying bending moments to both ends of the mirror by the rotation of the pair of rotating blocks; and a driving part comprising a transfer member transferred forward or backward in one direction, a single driver transferring the transfer member, and a pair of transmission parts respectively disposed on both ends of the transfer member to transmit the transfer force of the transfer member by the driver to the pair of rotating blocks, thereby rotating each of the pair of rotating blocks, wherein the first elastic body connects the rotating blocks to the base block so that the support points of the support blocks of the mirror are movable in a direction opposite to the moving direction of the central point of the mirror by a change in the curvature as the rotating blocks are rotated.

Each of the pair of transmission parts may include a transmission block connected to the base block through at least one second elastic body, the transmission block being connected to the transfer member through a hinge to rotate around a connection portion between the base block and the second elastic body by applying or releasing the transfer force of the transfer member, thereby applying an external force to the rotating blocks or elastically returning to its original position.

Each of the pair of transmission parts may further include an elastic member that is variable in length through elastic deformation thereof, and the transmission block may be connected to the transfer member through the elastic member.

The driving part may further include a guide part including at least one guide shaft fixed to the base block along a transfer direction of the transfer member and at least one guide body transferred forward or backward by being respectively engaged with the at least one guide shaft and coupled to the transfer member to guide the forward or backward transfer of the transfer member.

One of the transmission block and the rotating block may include a sliding member to smoothly slidably contact the rotating block when the transmission block applies the external force to the rotating block or elastically returns to its original position and allow a distance between each of the rotating blocks and the transmission block to correspond to a predetermined design value, the sliding member having a curved contact portion, which contacts the transmission or rotating block.

The transmission block and the second elastic body may be integrated with the base block.

The first elastic body may have a cantilever shape and is perpendicular to the reflection surface of the mirror which is disposed in an opening formed in a side of the base block, and when viewed from a front side, a first rotating point that is a connection portion between the base block and the first elastic body may be disposed on the reflection surface of the mirror or at a position adjacent to the reflection surface of the mirror.

The rotating blocks and the first elastic body may be integrated with the base block.

At least one of the pair of support blocks may be disposed on the rotating blocks through a connecting block fixed to the rotating blocks to be adjustable in position.

Another object of the present invention is to provide a mirror adjustment system for adjusting the position, angle, and curvature of a mirror, the mirror adjustment system including: a support disposed on a bottom surface; a position adjustment device fixedly disposed on the support, the position adjustment device transferring an installation plate in front/rear, left/right, and upward/downward directions and adjusting the inclinations of the installation plate with respect to the support; an angle adjustment device fixedly disposed on the installation plate, the angle adjustment device adjusting the rotation angle of a top surface with respect to a bottom surface thereof; and a curvature adjustment device comprising a base block disposed on the top surface of the angle adjustment device, a pair of rotating blocks which are connected to the base block through at least one first elastic body, each of the pair of rotating blocks being rotated around a connection portion between the base block and the first elastic body or elastically returning to its original position through the application or release of an external force, a pair of support blocks which are respectively disposed on the pair of rotating blocks to support both ends of the mirror, the pair of support blocks applying bending moments to both ends of the mirror by the rotation of the pair of rotating blocks, and a driving part rotating the pair of rotating blocks, wherein the first elastic body connects the rotating blocks to the base block so that the support points of the support blocks of the mirror are movable in a direction opposite to the moving direction of the central point of the mirror by a change in the curvature as the rotating blocks are rotated.

The first elastic body may have a cantilever shape and is perpendicular to the reflection surface of the mirror which is disposed in an opening defined in a side of the base block, and when viewed from a front side, a first rotating point that is a connection portion between the base block and the first elastic body may be disposed on the reflection surface of the mirror or at a position adjacent to the reflection surface of the mirror.

Another object of the present invention is to provide a mirror adjustment system for adjusting the position, angle, and curvature of a mirror, the mirror adjustment system including: a support disposed on a bottom surface; a position adjustment device fixedly disposed on the support, the position adjustment device transferring an installation plate in front/rear, left/right, and upward/downward directions and adjusting the inclinations of the installation plate with respect to the support; an angle adjustment device fixedly disposed on the installation plate, the angle adjustment device adjusting the rotation angle of a top surface with respect to a bottom surface thereof; and a curvature adjustment device comprising a base block disposed on the top surface of the angle adjustment device, a pair of rotating blocks which are connected to the base block through at least one first elastic body, each of the pair of rotating blocks being rotated around a connection portion between the base block and the first elastic body or elastically returning to its original position through the application or release of an external force, a pair of support blocks which are respectively disposed on the pair of rotating blocks to support both ends of the mirror, the pair of support blocks applying bending moments to both ends of the mirror by the rotation of the pair of rotating blocks, and a driving part rotating the pair of rotating blocks, wherein the driving part comprises a transfer member transferred forward or backward in one direction, a single driver forwardly or backwardly transferring the transfer member, and a pair of transmission parts respectively disposed on both ends of the transfer member to transmit the transfer force of the transfer member by the driver to the pair of rotating blocks, thereby rotating each of the pair of rotating blocks, and the first elastic body connects the rotating blocks to the base block so that the support points of the support blocks of the mirror are movable in a direction opposite to the moving direction of the central point of the mirror by a change in the curvature as the rotating blocks are rotated.

Each of the pair of transmission parts may include a transmission block connected to the base block through at least one second elastic body, the transmission block being connected to the transfer member through a hinge to rotate around a connection portion between the base block and the second elastic body by applying or releasing the transfer force of the transfer member, thereby applying an external force to the rotating blocks or elastically returning to its original position.

Each of the pair of transmission parts may further include an elastic member that is variable in length through elastic deformation thereof, and the transmission block may be connected to the transfer member through the elastic member.

Advantageous Effects

According to the mirror curvature adjustment device according to the present invention and the mirror adjustment system including the same, since the elastic bodies connecting the rotating blocks on which the support blocks are installed to the base block are disposed so that the support points of the support blocks of the mirror are movable in a direction opposite to the moving direction of the central point of the mirror by the change in the curvature when the curvature of the mirror is adjusted, even though the curvature of the mirror is adjusted, the movement of the central point of the mirror due to the change in the curvature is offset by the movement of the support points disposed on both ends of the mirror to minimize the absolute displacement of the central point of the mirror.

That is, since the central point of the mirror is fixed in position without being moved when the curvature of the mirror is adjusted, it may be unnecessary to perform a process of adjusting the position and angle of the mirror to position the electromagnetic waves onto the central point of the mirror again. Thus, the process of adjusting the mirror may be easily and simply performed.

Also, since the driving part for rotating the pair of rotating blocks to adjust the curvature of the mirror includes the pair of transmission parts and the transfer member so that it can be actuated by a single driver, the process of adjusting the curvature of the mirror may be simply performed by adjusting an input with respect to only one driver.

Thus, the mirror adjustment process for focusing the electromagnetic waves including the process of adjusting the curvature of the mirror may be easily performed.

In addition, since the transfer force of the transfer member by the driver is applied to each of the pair of transmission blocks through the pair of elastic members, the adjustment of the curvature of the mirror according to the rotation angles of the rotating blocks may be very accurately performed when compared to the transfer displacement of the transfer member. Therefore, the curvature adjustment process may be improved in accuracy.

Also, since the driving parts for applying the external forces to the rotating blocks to adjust the rotation angles of the rotating blocks which determine the curvature of the mirror include the first and second leaf springs which have one fixed end and are disposed parallel to each other and the driver, the rotation angles of the rotating blocks may be very minutely adjusted when compared to the displacement of the other end of the second leaf spring by the driver to accurately perform the adjustment of the curvature of the mirror.

In addition, since at least one of the pair of support blocks is installed on the rotating blocks through the connecting block which is fixed to be adjustable in position to the rotating blocks, it may prevent the mirror from being bent unintentionally, thereby improving the reliability of the device.

Figure 1:
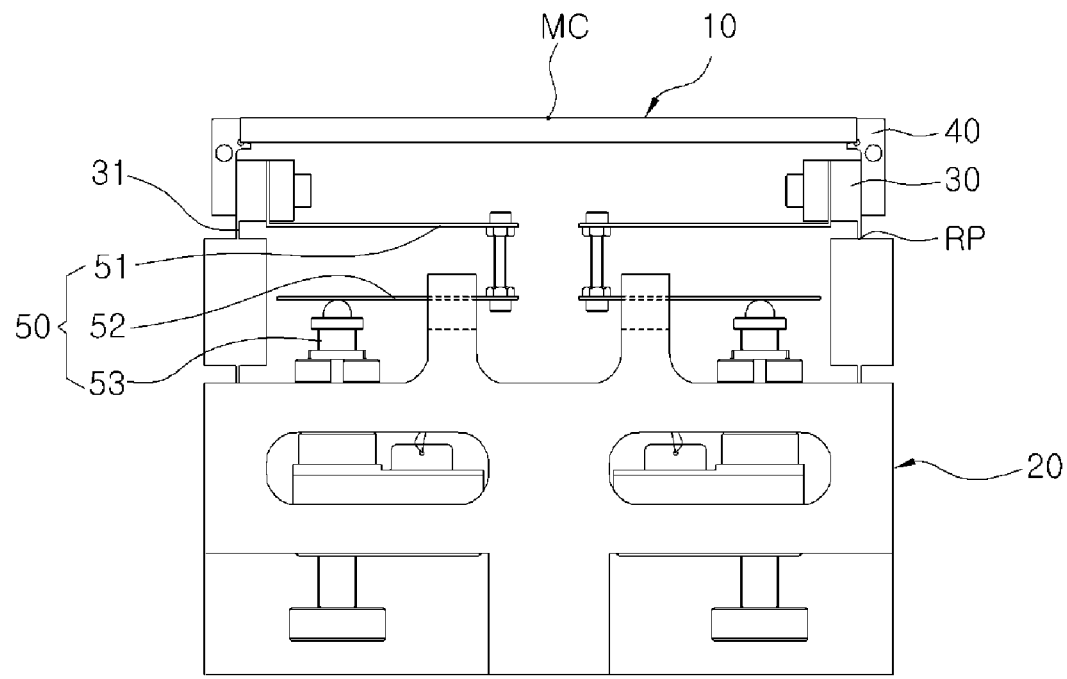
FIG. 1 is a front view of a device for adjusting the curvature of a mirror provided in a mirror adjustment system according to a related art.
Figure 2:
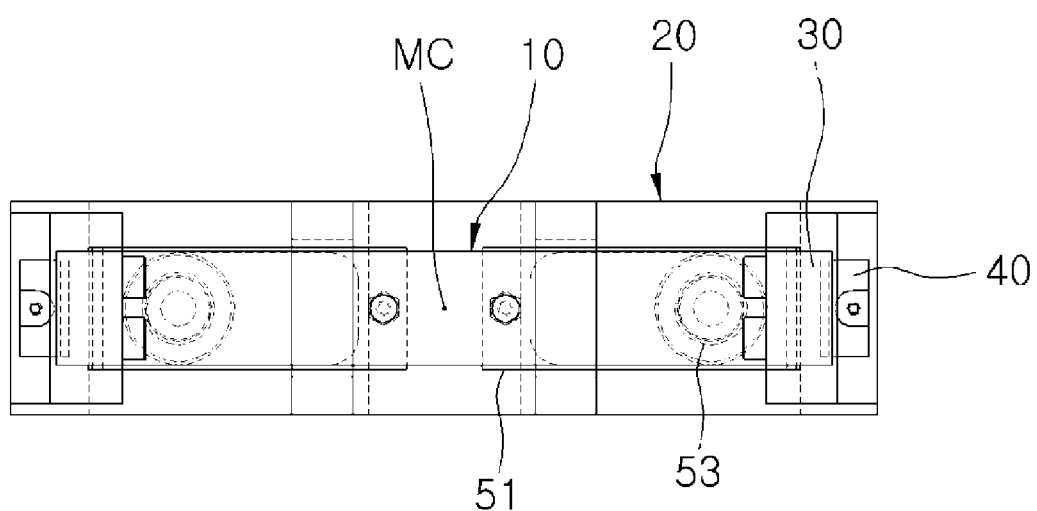
FIG. 2 is a plan view of the device for adjusting the curvature of the mirror provided in the mirror adjustment system according to the related art.
Figure 3:
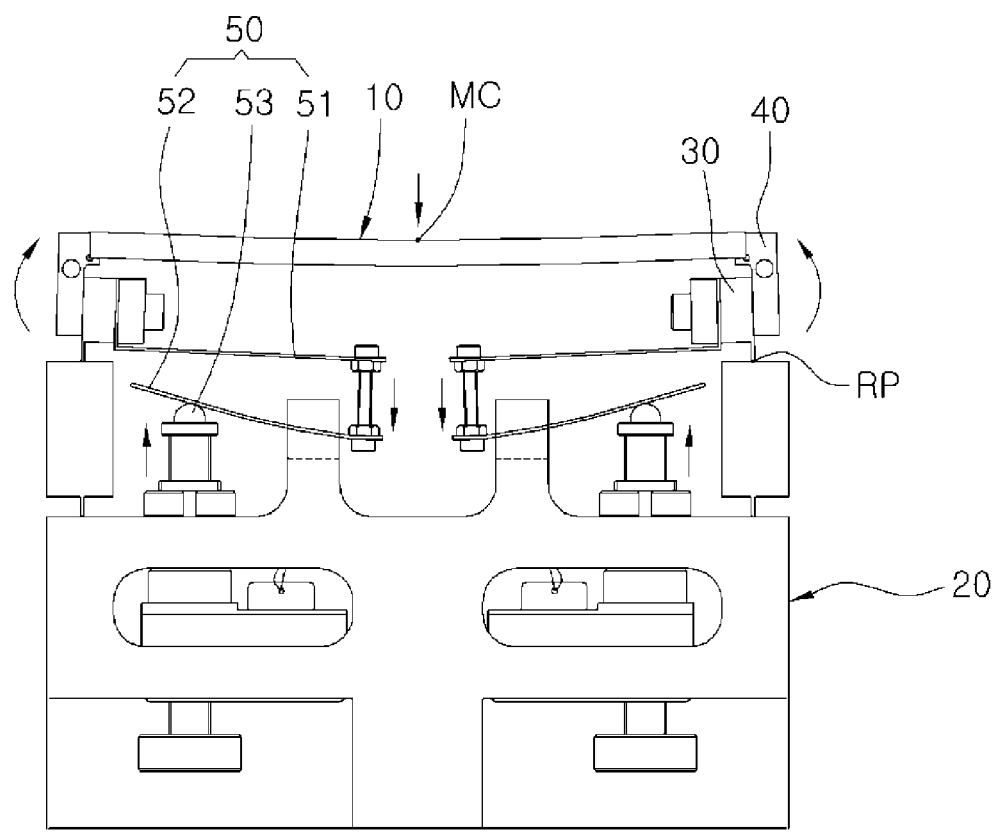
FIG. 3 is a front view illustrating an operation state of the device for adjusting the curvature of the mirror provided in the mirror adjustment system according to the related art.

DESCRIPTION OF THE SYMBOLS IN MAIN PORTIONS OF THE DRAWINGS 100, 100': curvature adjustment device 110, 110': base block
111: opening 112: rib
113: support member 120a, 120b, 120a', 120b': rotating block
121: first elastic body 122: screw hole
123: stepped portion 123-1: coupling hole
130: support block 131: connecting block
131-1: long hole 140, 140': driving part
141: first leaf spring 141-1: connecting member
142: second leaf spring 143, 143': driver
143-1: pressing member 143-2(143-1): driving shaft
144(141): transfer member 145(142): guide part
145-1(142-1): guide shaft 145-2(142-2): guide body
146(144): transmission part 146-1(144-1): transmission block
146-2(144-2): second elastic body 146-3(144-3): elastic member
146-4(144-4): connecting body 146-5(144-5): sliding member
150: displacement sensor 200: support
210: blocking part 211: light incident hole
212: light emission hole 213: chamber
220: support frame 300: position adjustment device
310: installation plate 400: angle adjustment device
500: feedthrough 10: mirror
HG: hinge MC: central point of mirror
RP1: first rotating point RP2: second rotating point
SP: support point SW: screw

MODE FOR CARRYING OUT THE INVENTION

Preferred embodiments of the present invention will be described below in more detail with reference to the accompanying drawings, such that those skilled in the art (hereinafter, referred to as a person of ordinary skilled in the art) can realize the technical ideas of the present invention without difficulties. The present invention may, however, be embodied in different forms and should not be construed as limited to the embodiments set forth herein.

A device for adjusting the curvature of a mirror according to the present invention and a mirror adjustment system including the same may be a device for adjusting the curvature of the mirror for focusing synchrotron radiation and a system including the device to adjust the position, angle, and curvature of the mirror, which are installed in a synchrotron radiation accelerator in which electrons are accelerated at almost the speed of light and then rotate by using electromagnets to generate electromagnetic waves having high brightness in a wide energy range such as an ultraviolet or X-ray range.

Hereinafter, the structure and operation of a device 100 for adjusting the curvature of a mirror (hereinafter, referred to as a curvature adjustment device) according to a first embodiment will be described in detail with reference to FIGS. 4 to 8.

The curvature adjustment device 100 according to the first embodiment includes a base block 110, a pair of rotating blocks 120a and 120b, a pair of support blocks 130, a driving part 140, and a pair of displacement sensors 150.

The base block 110 may serve as a body of the device. The base block 110 has a square tube shape so that the driving part 140 is installed therein. Also, an opening 111 in which a mirror 10 is disposed is defined in a side of the base block 110.

Figure 6:
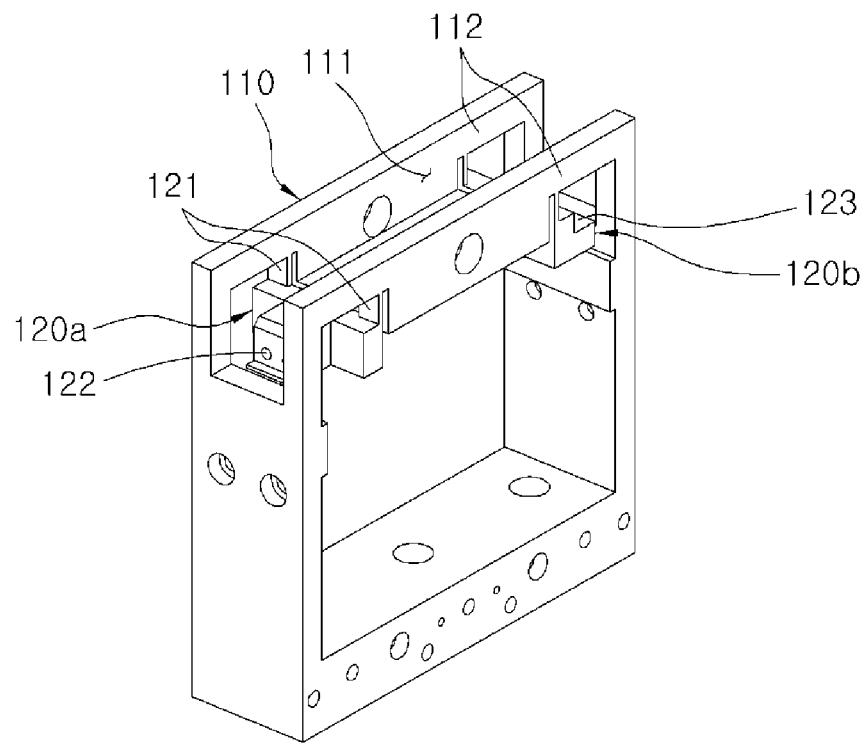
FIG. 6 is a perspective view illustrating a state in which a base block provided in the device for adjusting the curvature of the mirror includes a rotating block according to the first embodiment of the present invention.
Figure 7:
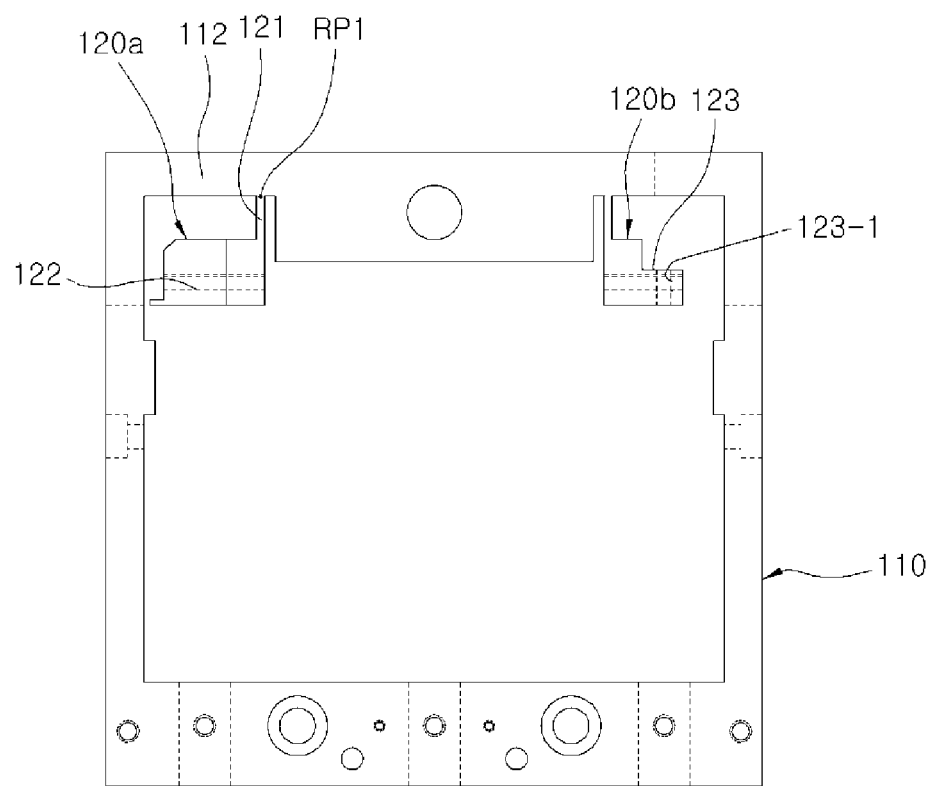
FIG. 7 is a front view illustrating the state in which the base block provided in the device for adjusting the curvature of the mirror includes the rotating block according to the first embodiment of the present invention.

As shown in FIG. 6, a pair of ribs 112 face each other on both sides of the opening 111 in a width direction of the opening 111 so that the pair of rotating blocks 120a and 120b are connected to each other through a plurality of first elastic bodies 121.

However, in the first embodiment of the present invention, the shape of the base block 110 is merely an example, and thus, the base block 110 may have various shapes.

The pair of rotating blocks 120a and 120b are respectively connected to the ribs 112 of the base block 110 through the first elastic bodies 121 each having a cantilever shape formed of an elastic material. The pair of rotating blocks 120a and 120b may be rotated about first rotating points RP1 that are connecting portions between the base block 110 and the first elastic bodies 121, respectively.

In more detail, external forces are applied to the pair of rotating blocks 120a and 120b by the driving part 140 in one direction. Thus, the first elastic bodies 121 are elastically deformed by the external forces to rotate the pair of rotating blocks 120a and 120b. Then, when the applied external force is released, each of the pair of rotating blocks 120a and 120b returns to its original position by an elastic restoring force of each of the first elastic bodies 121.

Here, the first elastic bodies 121 connect the rotating blocks 120a and 120b to the base block 110 so that the support points SP of the support blocks 130 move in a direction opposite to the moving direction of the central point MC (hereinafter, defined as the central point of the reflection surface of the mirror) of the mirror 10 due to a change in the curvature of the mirror 10 as the rotating blocks 120a and 120b are rotated.

Figure 4:
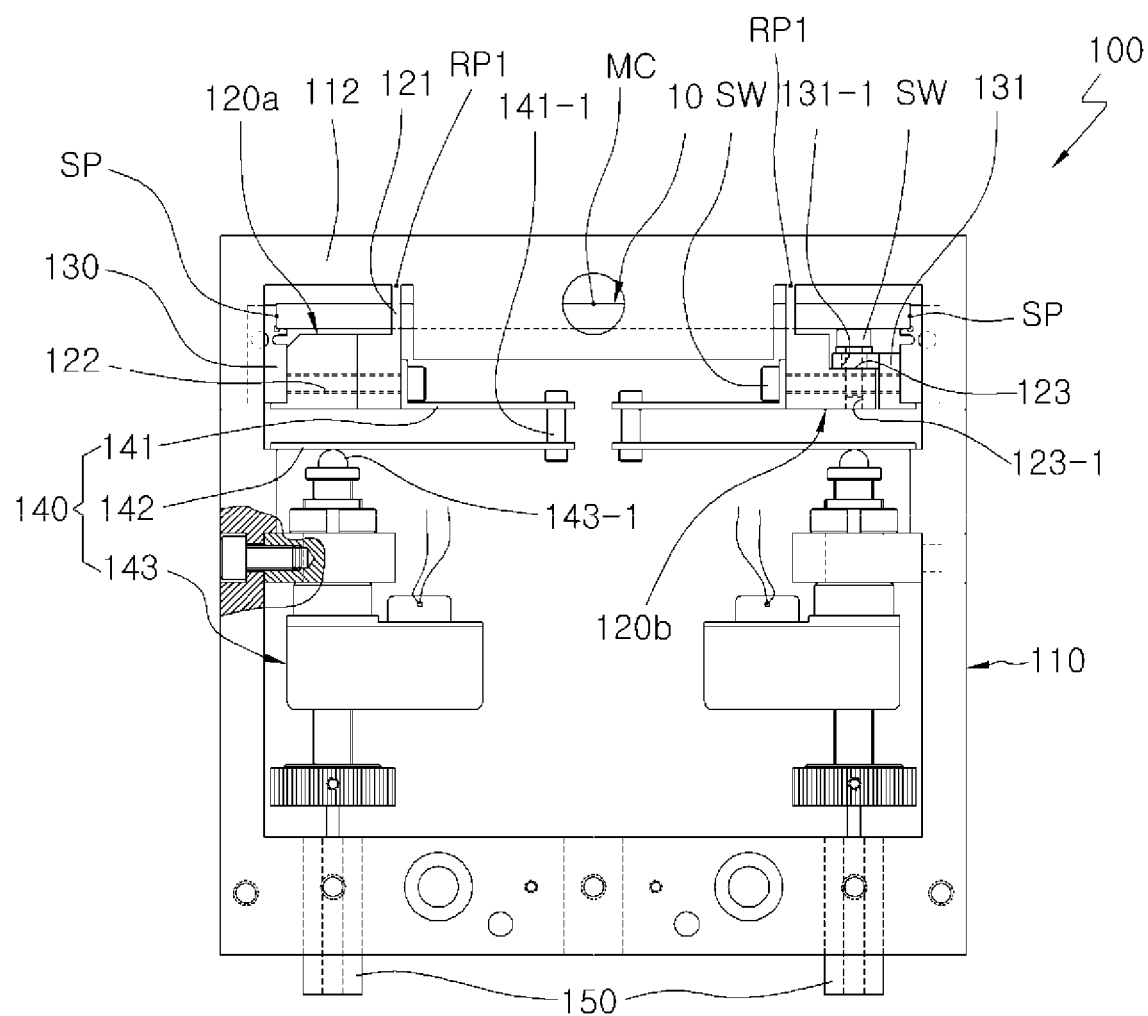
FIG. 4 is a front view of a device for adjusting the curvature of a mirror according to a first embodiment of the present invention.
Figure 5:
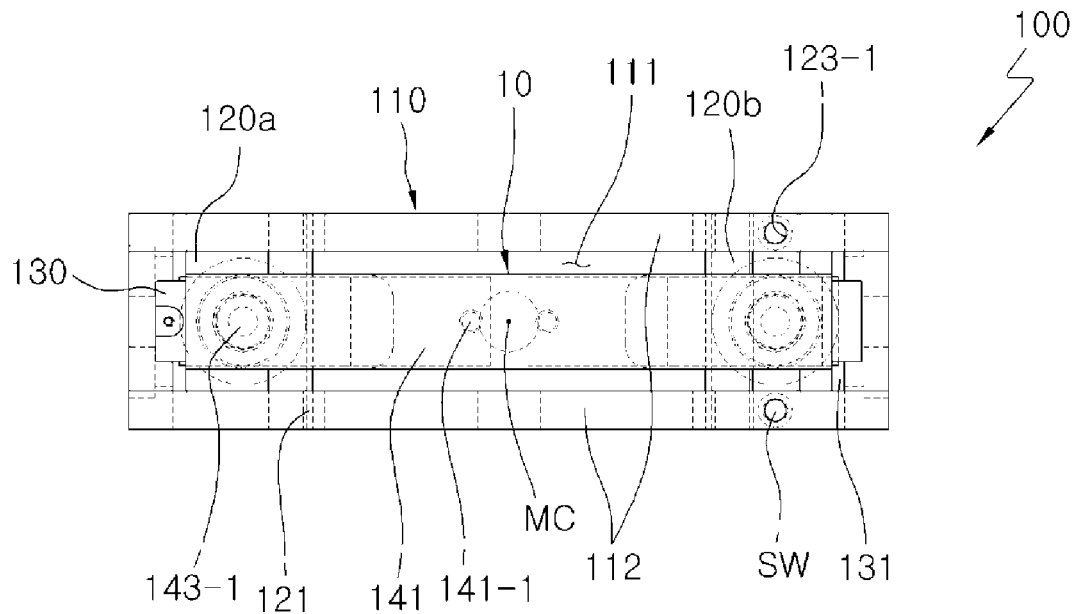
FIG. 5 is a plan view of the device for adjusting the curvature of the mirror according to the first embodiment of the present invention.

In more detail, as shown in FIG. 4, each of the first elastic bodies 121 is provided in the shape of the cantilever. Also, the first elastic bodies 121 are respectively connected to lower portions of the ribs 112 so that the first elastic bodies 121 are perpendicular to the reflection surface of the mirror 10. Thus, when viewed from a front side, the first rotating points RP1 are disposed at a front side adjacent to the reflection surface of the mirror 10.

Figure 8:
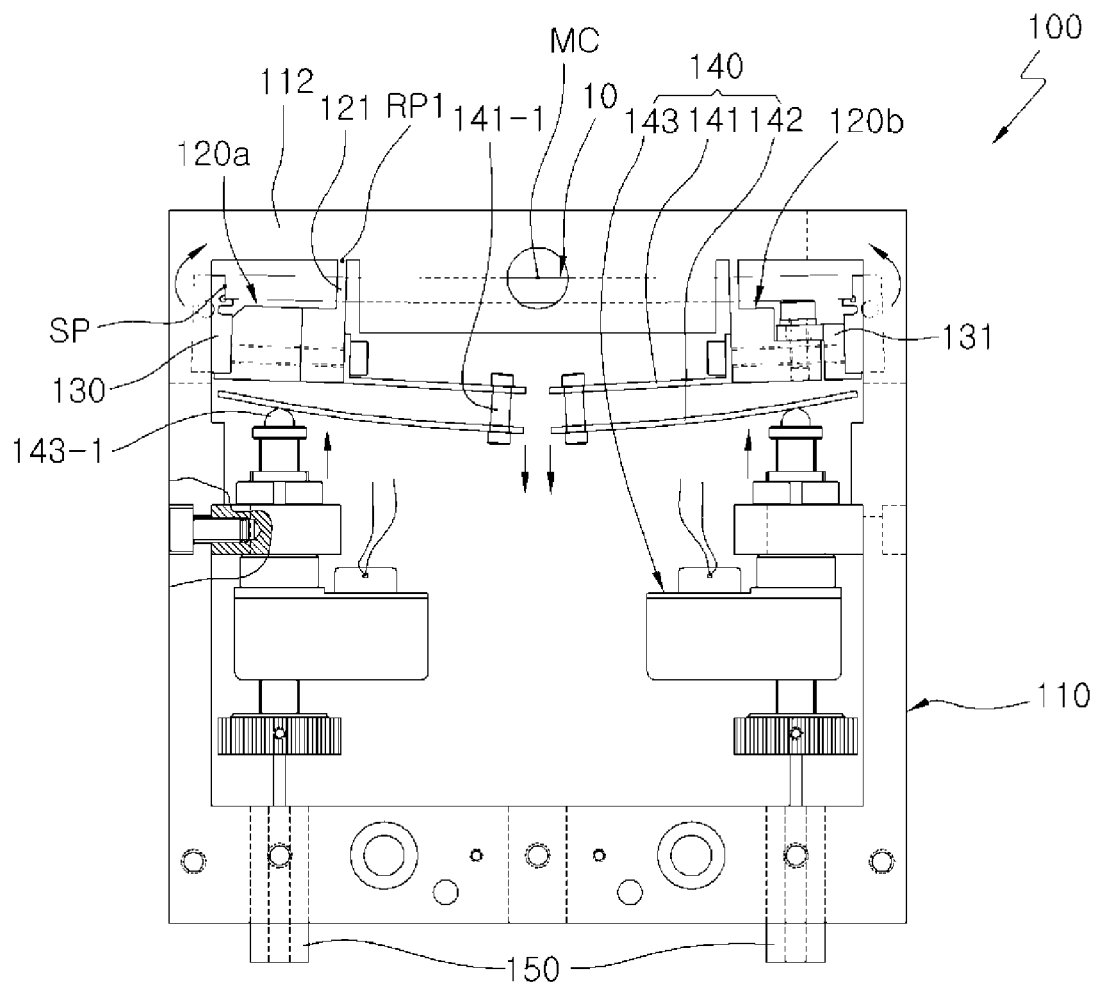
FIG. 8 is a front view illustrating an operation state of the device for adjusting the curvature of the mirror according to the first embodiment of the present invention.

Accordingly, as shown in FIG. 8, when the rotating blocks 120a and 20b are respectively rotated around the first rotating points RP1, the support points SP of the support blocks 130 move upward with respect to the mirror 10. On the other hand, the rotating blocks 120a and 120b are rotated to apply bending moments to the mirror 10, thereby deforming the mirror 10 so that the curvature of the mirror 10 is increased in a concave direction. Here, the central point MC of the mirror 10 is moved downward with respect to the support points SP.

However, the movement of the central point MC of the mirror 10 may be offset by the support points SP moving in an opposite direction thereof. Thus, the absolute displacement of the central point MC of the mirror 10 is barely changed with respect to the base block 110.

That is to say, due to the above-described embodied configurations of the first elastic bodies 121 and the positions of the first rotating points RP1, even though the rotating blocks 120a and 120b are rotated to adjust the curvature of the mirror 10, the central point MC of the mirror 10 may not move in position, but is fixed.

In the curvature adjustment device 100 according to the first embodiment of the present invention, each of the first elastic bodies 121 is integrated with the base block 110 and the rotating blocks 120a and 120b in a cantilever shape. However, the present invention is not limited thereto. For example, a separate member may be manufactured to fix and install the first elastic bodies 121 to each of the base block 110 and the rotating blocks 120a and 120b, and also, each of the first elastic bodies 121 may be embodied in various shapes in addition to the cantilever shape.

Also, in the first embodiment of the present invention, as shown in FIG. 4, the first elastic bodies 121 are disposed perpendicular to the reflection surface of the mirror 10 when viewed from the front side. However, the present invention is not limited thereto. For example, the first elastic bodies 121 may be disposed at various angles with respect to the reflection surface of the mirror 10 or disposed parallel to the reflection surface of the mirror 10. In this case, the first elastic bodies 121 may be adequately changed in position.

The positions of the first rotating points RP1 with respect to the mirror 10 and the support points SP may be structurally analyzed on the basis of the arrangement and material of each of the components. Thus, the movement of each of the support points SP may offset the movement of the central point MC of the mirror 10 to determine the position of the central point MC of the mirror 10 so that the central point MC of the mirror 10 with respect to the base block 110 is minimized in absolute displacement with respect to the base blocks 110.

When the positions of the first rotating points RP1 are structurally analyzed on the basis of the general arrangement and material of each of the components, the vertical positions of the first rotating points RP1 may be determined at the reflection surface of the mirror 10 or at a position adjacent to the reflection surface when viewed from the front side as shown in FIG. 4. That is to say, the positions of the first rotating points RP1 may be determined at a front or rear side adjacent to the reflection surface of the mirror 10 or on the reflection surface.

Also, the horizontal positions of the first rotating points RP1 may be determined at a position corresponding to about ¼ of each of both ends of the mirror 10 or a position adjacent to the position corresponding to about ¼ of each of both ends of the mirror 10.

However, since the positions of the first elastic bodies 121 and the first rotating points RP1 provided in the base block 110 are determined according to the results of the structural analysis as described above, the curvature adjustment device 100 according to the present invention may be configured so that the first rotating points RP1 are disposed at positions different from the above-described positions. The positions of the pair of first rotating points RP1 may be disposed horizontally symmetrical to each other in the curvature adjustment device 100. On the other hand, the positions of the pair of first rotating points RP1 may be disposed horizontally asymmetrical to each other according to the results of the structural analysis.

Of course, the positions of the first elastic bodies 121 and the first rotating points RP1 may be determined through experiments or rules from experience, and not from structural analysis.

In the curvature adjustment device according to the first embodiment of the present invention, although the curvature of the mirror 10 is adjusted in a concave direction as in an example, the curvature of the mirror 10 may be adjusted in a convex direction. In this case, the external forces applied to the rotation blocks 120a and 120b may be applied in a direction opposite to that in the case where the curvature of the mirror 10 is adjusted in the concave direction.

The pair of support blocks 130 are respectively fixed and installed to the pair of rotating blocks 120a and 120b through a screw SW coupled to a screw hole 122 defined in each of the rotating blocks 120a and 120b to support both ends of the mirror 10. As the rotating blocks 120a and 120b are rotated, bending moments may be applied to both ends of the mirror 10.

The pair of support blocks 130 are assembled with the mirror 10 to form an assembly, and is then installed on the pair of rotating blocks 120a and 120b. To prevent an initial deformation of the mirror 10 from occurring when the assembly is installed on the pair of rotating blocks 120a and 120b, at least one of the pair of support blocks 130, as shown in FIG. 4, may be installed on the rotating block 120*b* through the connecting block 131 that is position-adjustably fixed to the rotating block 120*b*.

In more detail, the rotating block 120*b* has a stepped portion 123 on an outer end thereof. A coupling hole 123-1 to which the screw SW is coupled is vertically defined in the stepped portion 123. A long hole 131-1 through which the screw SW passes is defined in the connecting block 131 in a length direction of the connecting block 131. The connecting block 131 may be position-adjustably fixed to the rotating block 120*b*.

Thus, when the assembly of the mirror 10 and the pair of support blocks 130 to be installed has a length less than the distance between the pair of rotating blocks 120*a* and 120*b*, an installation position of the connecting block 131 with respect to the rotating block 120*b* may be adjusted to effectively prevent the mirror 10 from being unnecessarily bent when the corresponding mirror 10 is installed.

In the first embodiment of the present invention, although the support block 130 is adjustable in installation position with respect to the rotating block 120*b* through the connecting block 131 that is a separate member, the present invention is not limited thereto. For example, if the support block 130 has an L shape and also has the long hole therein, the support block 130 may be directly and position-adjustably installed on the rotating block 120*b*.

The driving part 140 may apply an external force to each of the pair of rotating blocks 120*a* and 120*b* to symmetrically rotate the pair of rotating blocks 120*a* and 120*b*. Thus, the pair of support blocks 130 may be rotated together with the rotating blocks 120*a* and 120*b* to symmetrically apply bending moments to both ends of the mirror 10.

For this, the driving part 140 may include a pair of first and second leaf springs 141 and 142 connected to each other by a connecting member 141-1 and a pair of drivers 143.

The first leaf spring 141 is fixed to each end of the rotating blocks 120*a* and 120*b* in parallel to the mirror 10. An end of the second leaf spring 142 is fixed in parallel to the other end of the first leaf spring 141 in a state where the second leaf spring 142 is spaced a predetermined distance from the first leaf spring 141 through the connecting member 141-1.

Also, the pair of drivers 143 may transfer a pressing member 143-1 to press the other end of the second leaf spring 142 toward the first leaf spring 141 or release the pressing force.

As described above, when the drivers 143 apply the external forces to the rotating blocks 120*a* and 120*b* through the first and second leaf springs 141 and 142, the magnitude of the force applied to the rotating blocks 120*a* and 120*b* may be more minutely adjusted than a length transferred for pressing the second leaf spring 141 by the pressing member 143-1.

That is, even though the second leaf spring 142 is pressed by a predetermined length by the pressing member 143-1, the first leaf spring 141 may be pressed by a relatively short length due to the elastic deformation of the second leaf spring 142. Also, the first leaf spring 141 may be elastically deformed to decrease a final force transmitted into the rotating blocks 120*a* and 120*b*.

Thus, the rotation angle of each of the rotating blocks 120*a* and 120*b* may be minutely adjusted. Therefore, the curvature of the mirror 10 may be very minutely adjusted.

Although the drivers 140 include the first and second leaf springs 141 and 142 in the first embodiment of the present invention, the present invention is not limited to that number of leaf springs. For example, one or at least three leaf springs may be provided.

Also, each of the drivers 140 may minutely adjust the curvature of the mirror 10 by using a different elastic member in addition to the leaf spring.

As shown in FIG. 4B, the pair of displacement sensors 150 are respectively connected to the pair of drivers 143 to measure displacements that occur when each of the pair of drivers 143 presses the second leaf spring 142 through the pressing member 143-1.

Since measured values of the displacement sensors 150, rotation values of the rotating blocks 120*a* and 120*b*, and a curvature adjustment value of the mirror 10 may be linearly proportional to each other, the measured values of the displacement sensors 150 may be confirmed to operate the drivers 143, thereby adjusting the curvature of the mirror 10.

The displacement sensors 150 may not be essential components in the curvature adjustment device according to the present invention. Different sensors, which may be replaced with the displacement sensors 150, for directly measuring the rotation angles of the rotating blocks 120*a* and 120*b* may be provided.

Hereinafter, an operation and used state of the curvature adjustment device 100 according to the first embodiment of the present invention will be described in detail on the basis of an order of processes for adjusting the curvature of the mirror 10 with reference to FIG. 8.

First, to adjust the curvature of the mirror 10, the drivers 143 of the driving parts 140 are operated to press an end of the second leaf spring 142 by using the pressing member 143-1. Thus, the second leaf spring 142 is pressed by the pressing member 143-1 and then elastically deformed. As a result, the other end connected to the first leaf spring 141 through the connecting member 141-1 descends.

Next, the first leaf spring 141 is elastically deformed due to the descending of the end of the first leaf spring 141, and thus, moments are applied to the rotating blocks 120*a* and 120*b* connected to the other end of the first leaf spring 141.

Then, as the first elastic bodies 121 are elastically deformed by the moments applied through the first leaf springs 141, the rotating blocks 120*a* and 120*b* are rotated around the first rotating points RP1. Thus, the support blocks 130 fixedly installed on the rotating blocks 120*a* and 120*b* may be rotated also.

Accordingly, the support points SP of the support blocks 130 with respect to both ends of the mirror 10 are moved upward in FIG. 8. The curvature of the mirror 10 is adjusted in a concave direction by the bending moments applied through the pair of support blocks 130.

Here, although the curvature of the mirror 10 is adjusted in the concave direction, and the central point MC of the mirror 10 is moved downward from both ends of the mirror 10, the downward movement of the central point MC may be offset by the upward movement of the support points SP of both ends of the mirror 10. Thus, the central point MC of the mirror 10 may not be moved with respect to the base block 110, but may be fixed.

Figure 9:
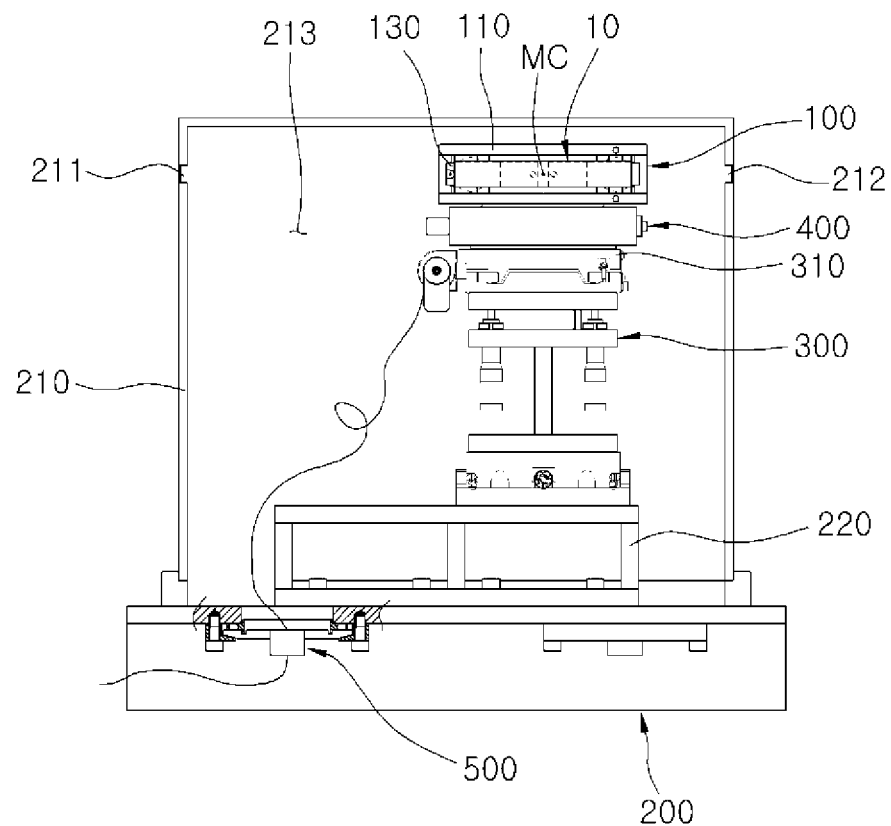
FIG. 9 is a schematic front view of a mirror adjustment system according to the first embodiment of the present invention.

Hereinafter, the mirror adjustment system according to the first embodiment of the present invention will be described in detail with reference to FIG. 9.

The mirror adjustment system according to the first embodiment of the present invention includes a support 200, a position adjustment device 300, an angle adjustment device 400, and the above-described curvature adjustment device 100.

The support 200 supports other components installed on a bottom surface. A blocking part 210 having a predetermined thickness is disposed on a top surface of the support 200 to form a chamber 213.

The chamber 213 formed by the blocking part 210 may protect the position adjustment device 300, the angle adjustment device 400, and the curvature adjustment device 100, which are disposed therein, against the outside. Also, the chamber 213 may be filled with a helium gas that is an inert gas, or the inside of the chamber 213 may be in a vacuum state to reduce the attenuation of electromagnetic waves due to the atmosphere and delay corrosion on the reflection surface of the mirror 10.

Also, the blocking part 210 has a light incident hole 211 through which the electromagnetic waves are incident onto the mirror 10 and a light emission hole 212 through which the electromagnetic waves reflected by the mirror 10 are emitted. The light incident hole 211 and the light emission hole 212 may be formed by a kapton film or a beryllium window hole.

The position adjustment device 300 is fixedly installed on a top surface of the support 200 within the chamber 213 through a support frame 220 to transfer an installation plate 310 disposed in an upper side in front/rear, left/right, and upward/downward directions. Also, the mirror adjustment system according to the first embodiment of the present invention may adjust front/rear and left/right inclinations of the installation plate 310 by using three drivers which are provided in the position adjustment device 300 to vertically adjust the position of the installation plate 310.

Thus, the angle adjustment device 400, the curvature adjustment device 100, and the mirror 10 which are disposed above the installation plate 310 may be transferred in the front/rear, left/right, and upward/downward directions by the position adjustment device 300 and also may be adjusted in front/rear and left/right inclinations.

The angle adjustment device 400 is fixedly installed on the installation plate 310. Also, a top surface of the angle adjustment device 400 may be adjusted in angle with respect to a bottom surface thereof. Thus, the angle adjustment device 400 adjusts the pitch angle of the curvature adjustment device 100 including the mirror 10, which is disposed on the top surface thereof.

As described above, the curvature adjustment device 100 is disposed on the top surface of the angle adjustment device 400 to adjust the curvature of the mirror 10, thereby focusing the electromagnetic waves. Since the specific constitution and operation of the curvature adjustment device 100 are sufficiently described, further detailed description of the mirror adjustment system, which duplicates the descriptions of the curvature adjustment device 100, will be omitted.

The mirror adjustment system may include a feedthrough 500 for connecting cables for controlling the drivers operating the position adjustment device 300, the angle adjustment device 400, and the curvature adjustment device 100 to the inside or outside of the chamber 213.

The process of adjusting the mirror by using the mirror adjustment system will be performed as follows.

First, a process for matching the electromagnetic waves introduced through the light incident hole 211 with the central point MC of the mirror 10 is performed. Since synchrotron radiation is not visible light, and has a very small beam size in this process, the electromagnetic waves reflected by the mirror 10 may be measured by using an ionization chamber, etc., and then, a plurality of measured light intensities may be analyzed to confirm the relative position of the electromagnetic waves with respect to the mirror 10.

Thus, the position adjustment device 300 that can adjust the front/rear, left/right, and up/down positions of the mirror 10 and the inclinations of the mirror 10, the angle adjustment device 400 for the pitch angle of the mirror 10, and the above-described ionization chamber may be combined with each other to match the electromagnetic waves incident onto the mirror 10 with the central point MC of the mirror 10.

Thereafter, a process of focusing the electromagnetic waves reflected by the mirror 10 is performed to reduce the beam size. Since the beam size is a function with respect to the pitch angle of the mirror 10 as well as the curvature of the mirror 10, the curvature adjustment device 100 and the angle adjustment device 400 may be alternately and repeatedly used to search for a curvature and a pitch angle for minimizing the beam size, thereby finally minimizing the beam size.

Here, in the curvature adjustment device according to the present invention, even though the curvature of the mirror 10 is adjusted since the central point MC of the mirror which is adjusted in position and angle is not moved, but is fixed, it may be unnecessary to perform a process for focusing the electromagnetic waves onto the central point MC of the mirror 10 again, as with an existing curvature adjustment device. Thus, the process of adjusting the mirror 10 may be significantly simplified.

Although the mirror adjustment system for the horizontal mirror in which the reflection surface of the mirror 10 is provided as a front surface is described as the mirror adjustment system according to the first embodiment, a mirror adjustment system for a vertical mirror in which the reflection surface of the mirror 10 is provided as a plan or side surface may be realized through a method similar to the above-described method. In addition, the mirror adjustment system for the vertical mirror may be installed and used together with the mirror adjustment system for the horizontal mirror within the chamber 213 of the mirror adjustment system according to the foregoing first embodiment of the present invention.

As described above, according to the curvature adjustment device 100 according to the present invention and the mirror adjustment system including the same, since the first elastic bodies 121 connecting the rotating blocks 120a and 120b on which the support blocks 130 are installed to the base block 110 are disposed so that the support points SP of the support blocks 130 of the mirror 10 are movable in a direction opposite to the moving direction of the central point MC of the mirror 10 by the change in the curvature when the curvature of the mirror 10 is adjusted, even though the curvature of the mirror 10 is adjusted, the movement of the central point MC of the mirror 10 due to the change in the curvature is offset by the movement of the support points SP disposed on both ends of the mirror 10 to minimize the absolute displacement of the central point MC of the mirror 10. That is, since the central point MC of the mirror 10 is fixed in position when the curvature of the mirror 10 is adjusted, the process of adjusting the mirror 10 may be easily performed.

Hereinafter, a structure and operation of a curvature adjustment device 100 of a mirror according to a second embodiment will be described in detail with reference to FIGS. 10 to 13.

The curvature adjustment device 100' according to the second embodiment includes a base block 110', a pair of rotating blocks 120a' and 120b', a pair of support blocks 130, a driving part 140', and a displacement sensor 150.

The base block 110' may serve as a body of the device. The base block 110' has a square tube shape so that the driving part 140' is installed therein. Also, an opening 111 in which a mirror 10 is disposed is defined in a side of the base block 110'.

Figure 12:
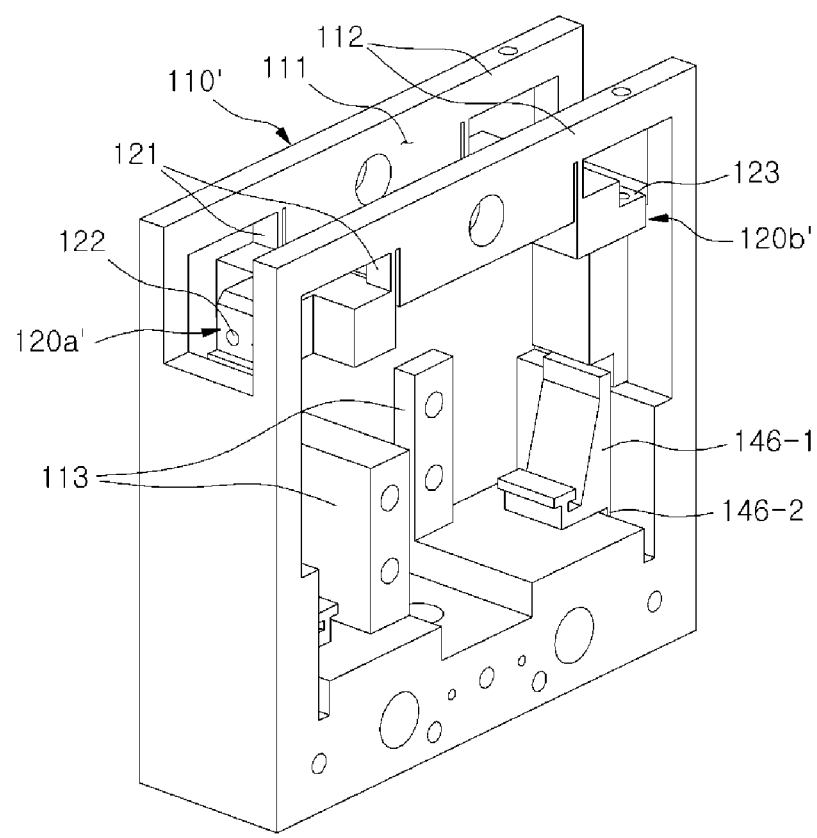
FIG. 12 is a perspective view illustrating a state in which a base block provided in the device for adjusting the curvature of the mirror includes a rotating block and a transmission block according to the second embodiment of the present invention.

As shown in FIG. 12, a pair of ribs 112 face each other on both sides of the opening 111 in a width direction of the opening 111 so that the pair of rotating blocks 120a' and 120b' are connected to each other through a plurality of first elastic bodies 121.

Also, a support member 113, on which a driver 143' of a driving part 140' that will be described later is disposed, is on a central portion of the base block 110'.

However, in the second embodiment of the present invention, the shape of the base block 110' is merely an example, and thus, the base block 110' may have various shapes.

The pair of rotating blocks 120a' and 120b' are respectively connected to the ribs 112 of the base block 110' through the first elastic bodies 121 each having a shape of a cantilever formed of an elastic material. The pair of rotating blocks 120a' and 120b' may be rotated about first rotating points RP1 that are connecting portions between the base block 110' and the first elastic bodies 121, respectively.

Figure 10:
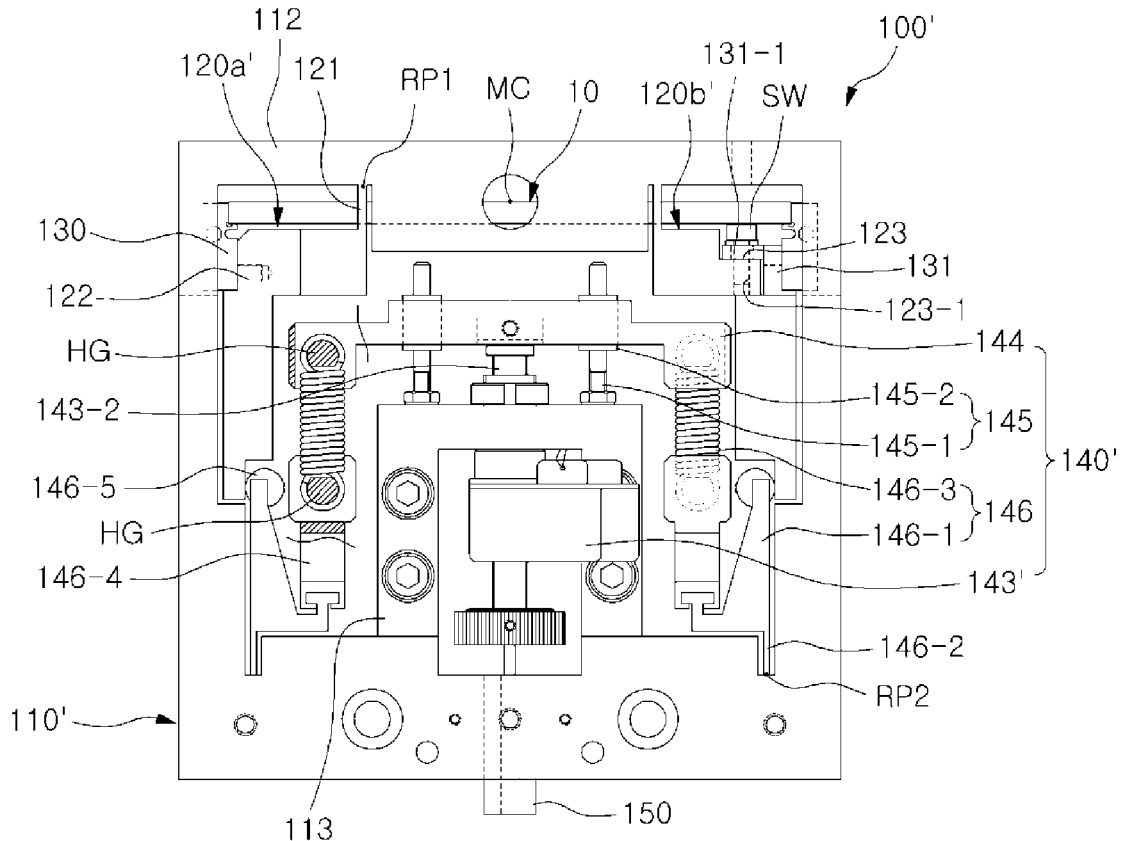
FIG. 10 is a front view of a device for adjusting the curvature of a mirror according to a second embodiment of the present invention.

Also, as shown in FIG. 10, the pair of rotating blocks 120a' and 120b' extend downward, and external forces are applied to the extending ends of the rotating blocks 120a' and 120b' from the driving part 140'.

In more detail, the external force is applied to each of the extending ends of the pair of rotating blocks 120a' and 120b' by the driving part 140' in one direction. Thus, the first elastic bodies 121 are elastically deformed by the external forces to rotate the pair of rotating blocks 120a' and 120b'. Then, when the applied external force is released, each of the pair of rotating blocks 120a' and 120b' returns to its original position by an elastic restoring force of each of the first elastic bodies 121.

Here, the first elastic bodies 121 connect the rotating blocks 120a' and 120b' to the base block 110 so that the support points SP of the support blocks 130 move in a direction opposite to the moving direction of the central point MC (hereinafter, defined as the central point of the reflection surface of the mirror) of the mirror 10 due to a change in the curvature of the mirror 10 as the rotating blocks 120a' and 120b' are rotated.

In more detail, as shown in FIG. 10, each of the first elastic bodies 121 is provided in the shape of the cantilever. Also, the first elastic bodies 121 are respectively connected to lower portions of the ribs 112 so that the first elastic bodies 121 are perpendicular to the reflection surface of the mirror 10. Thus, when viewed from the front side, the first rotating points RP1 are disposed at a front side adjacent to the reflection surface of the mirror 10.

Figure 13:
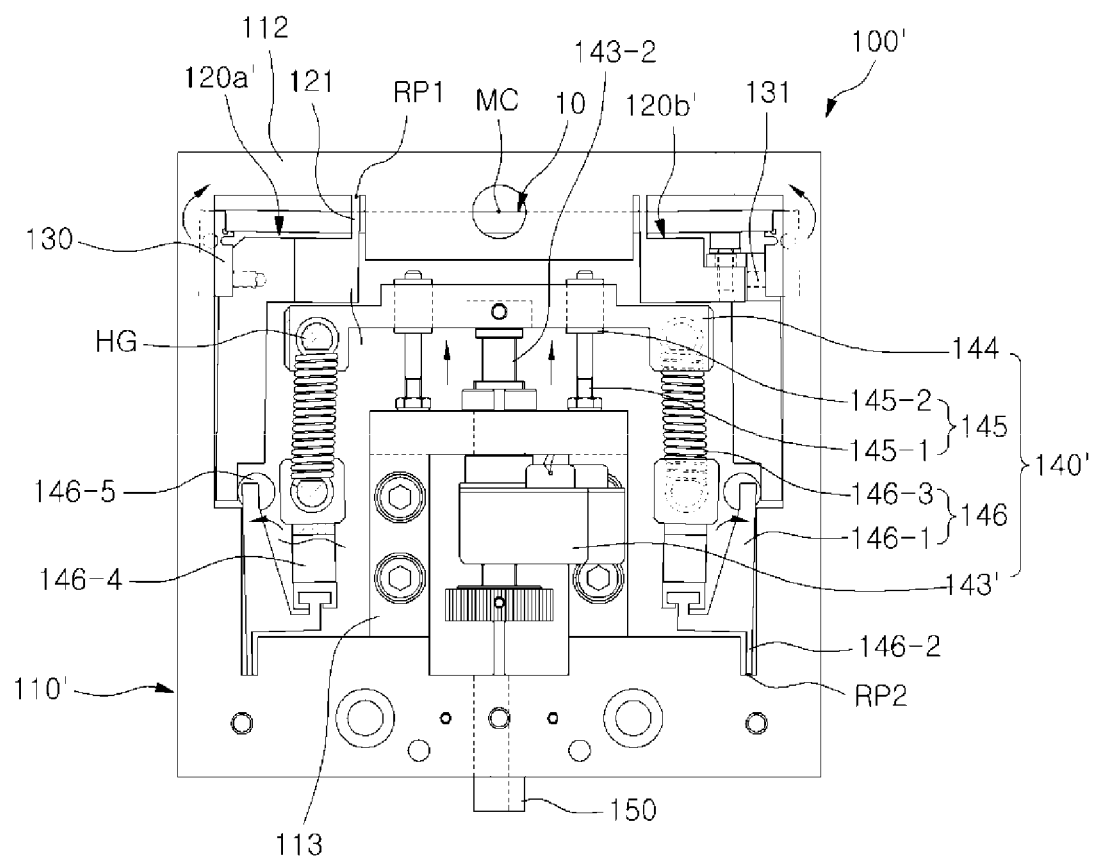
FIG. 13 is a front view illustrating an operation state of the device for adjusting the curvature of the mirror according to the second embodiment of the present invention.

Accordingly, as shown in FIG. 13, when the rotating blocks 120a' and 20b' are respectively rotated around the first rotating points RP1, the support points SP of the support blocks 130 move upward with respect to the mirror 10. On the other hand, the rotating blocks 120a' and 120b' are rotated to apply bending moments to the mirror 10, thereby deforming the mirror 10 so that the curvature of the mirror 10 is increased in a concave direction. Here, the central point MC of the mirror 10 is moved downward with respect to the support points SP.

However, the movement of the central point MC of the mirror 10 may be offset by the support points SP moving in an opposite direction thereof. Thus, the absolute displacement of the central point MC of the mirror 10 is barely changed with respect to the base block 110'.

That is to say, due to the above-described embodied configurations of the first elastic bodies 121 and the positions of the first rotating points RP1, even though the rotating blocks 120a' and 120b' are rotated to adjust the curvature of the mirror 10, the central point MC of the mirror 10 may not move in position, but may be fixed.

In the curvature adjustment device 100' of the mirror according to the second embodiment of the present invention, each of the first elastic bodies 121 is integrated with the base block 110' and the rotating blocks 120a' and 120b' in a cantilever shape. However, the present invention is not limited thereto. For example, a separate member may be manufactured to fix and install the first elastic bodies 121 to each of the base block 110' and the rotating blocks 120a' and 120b', and also, each of the first elastic bodies 121 may be embodied in various shapes in addition to the cantilever shape.

Also, although the first elastic bodies 121 are provided in duplicate to each of the pair of rotating blocks 120a' and 120b', i.e., are provided in quadruplicate to the pair of rotating blocks 120a' and 120b', the present invention is not limited in number to the pair of rotating blocks 120a' and 120b'.

Also, in the second embodiment of the present invention, as shown in FIG. 10, the first elastic bodies 121 are disposed perpendicular to the reflection surface of the mirror 10 when viewed from the front side. However, the present invention is not limited thereto. For example, the first elastic bodies 121 may be disposed at various angles with respect to the reflection surface of the mirror 10 or disposed parallel to the reflection surface of the mirror 10. In this case, the first elastic bodies 121 may be adequately changed in position.

The positions of the first rotating points RP1 with respect to the mirror 10 and the support points SP may be structurally analyzed on the basis of the arrangement and material of each of components. Thus, the movement of each of the support points SP may offset the movement of the central point MC of the mirror 10 to determine the position of the central point MC of the mirror 10 so that the central point MC of the mirror 10 with respect to the base block 110' is minimized in absolute displacement.

When the positions of the first rotating points RP1 are structurally analyzed on the basis of the general arrangement and material of each of the components, the vertical positions of the first rotating points RP1 may be determined at the reflection surface of the mirror 10 or at a position adjacent to the reflection surface when viewed from the front side as shown in FIG. 10. That is to say, the positions of the first rotating points RP1 may be determined to be at a front or rear side adjacent to the reflection surface of the mirror 10 or on the reflection surface.

Also, the horizontal positions of the first rotating points RP1 may be determined to be at a position corresponding to about ¼ of each of both ends of the mirror 10 or a position adjacent to the position corresponding to about ¼ of each of both ends of the mirror 10.

However, since the positions of the first elastic bodies 121 and the first rotating points RP1 provided in the base block 110' are determined according to the results of the structural analysis as described above, the curvature adjustment device 100' of the mirror 10 according to the present invention may be configured so that the first rotating points RP1 are disposed at positions different from the above-described positions. The positions of the pair of first rotating points RP1 may be disposed horizontally symmetrical to each other in the curvature adjustment device 100'. On the other hand, the positions of the pair of first rotating points RP1 may be disposed horizontally asymmetrical to each other according to the results of the structural analysis.

Of course, the positions of the first elastic bodies 121 and the first rotating points RP1 may be determined through experiments or rules from experience, and not from structural analysis.

In the curvature adjustment device 100' according to the first embodiment of the present invention, although the curvature of the mirror 10 is adjusted in the concave direction as an example, the curvature of the mirror 10 may be convexly adjusted. In this case, the external forces applied to the rotation blocks 120a' and 120b' may be applied in directions opposite to those in the case where the curvature of the mirror 10 is adjusted in the concave direction.

The pair of support blocks 130 are respectively fixed and installed to the pair of rotating blocks 120a' and 120b' through a screw SW coupled to a screw hole 122 defined in each of the rotating blocks 120a' and 120b' to support both ends of the mirror 10. As the rotating blocks 120a' and 120b' are rotated, bending moments may be applied to both ends of the mirror 10.

The pair of support blocks 130 are assembled with the mirror 10 to form an assembly, and then is installed on the pair of rotating blocks 120a' and 120b'. To prevent an initial deformation of the mirror 10 from occurring when the assembly is installed on the pair of rotating blocks 120a' and 120b', at least one of the pair of support blocks 130, as shown in FIG. 10, may be installed on the rotating block 120b through the connecting block 131 fixed to the rotating block 120b' to be adjustable in position.

In more detail, the rotating block 120b' has a stepped portion 123 on an outer end thereof. A coupling hole 123-1 to which the screw SW is coupled is vertically defined in the stepped portion 123. A long hole 131-1 through which the screw SW passes is defined in the connecting block 131 in a length direction of the connecting block 131. The connecting block 131 may be position-adjustably fixed to the rotating block 120b'.

Thus, when the assembly of the mirror 10 and the pair of support blocks 130 to be installed has a length less than the distance between the pair of rotating blocks 120a' and 120b', an installation position of the connecting block 131 with respect to the rotating block 120b' may be adjusted to effectively prevent the mirror 10 from being unnecessarily bent when the corresponding mirror 10 is installed.

In the second embodiment of the present invention, although the support block 130 is adjustable in installation position with respect to the rotating block 120b' through the connecting block 131 that is a separate member, the present invention is not limited thereto. For example, if the support block 130 has an L shape and also has the long hole therein, the support block 130 may be directly and position-adjustably installed on the rotating block 120b'.

The driving part 140' may apply an external force to each of the pair of rotating blocks 120a' and 120b' to symmetrically rotate the pair of rotating blocks 120a' and 120b'. Thus, the pair of support blocks 130 may be rotated together with the rotating blocks 120a' and 120b' to symmetrically apply bending moments to both ends of the mirror 10.

For this, the driving part 140' may include a transfer member 144, a guide part 145, a single driver 143', and a pair of transmission parts 146.

The transfer member 144 has a plate shape with a predetermined width and length. A driving shaft 143-2 (that will be described later) of the driver 143' is coupled to a central portion of the transfer member 144. As the driving shaft 143-2 is transferred forward and backward by the driver 143', the transfer member 144 may be transferred forward and backward in one direction.

Although the transfer member 144 is coupled to the driving shaft 143-2 in the second embodiment of the present invention, the present invention is not limited thereto. For example, the driving shaft 143-2 may simply contact the transfer member 144. Nonetheless, the transfer member 144 may ascend by a pressing force of the driving shaft 143-2 and descend by an elastic force of an elastic member 146-3 that will be described later to return to its original position.

Also, in this case, a concave cone may be defined in the transfer member 144 so that an end of the driving shaft 143-2 is inserted into the portion in contact with the driving shaft 143-2. Thus, the driving shaft 143-2 and the transfer member 144 may be maintained in a state of stable contact therebetween.

The guide part 145 stably guides the round trip transfer of the transfer member 144. For this, the guide part 145 may include a plurality of guide shafts 145-1 and a plurality of guide bodies 145-2.

Each of the plurality of guide shafts 145-1 has a shaft shape. The plurality of guide shafts 145-1 are disposed symmetrical to each other on sides of the pair of the transmission parts 146 with respect to the driver 143' disposed on the support member 113. The plurality of guide shafts 145-1 are fixed parallel to each other along the transfer direction of the transfer member 144.

The plurality of guide bodies 145-2 may be engaged with the plurality of guide shafts 145-1 and thus be transferred forward and backward and coupled to the transfer member 144. Here, since the plurality of guide bodies 145-2 are disposed symmetrical to each other on both sides of the transfer member 144 with respect to the connected portion between the driving shaft 143-2 disposed on the driver 143' and the transfer member 144, the transfer member 144 may be stably transferred forward and backward.

Although the guide shafts 145-1, each having the shaft shape, are provided in quadruplicate as two pairs on sides of the transmission parts 146, and also the guide bodies 145-2 engaged with the guide shafts 145-1 are provided in quadruplicate in the second embodiment of the present invention, the present invention is not limited to the shape and number of guide shafts 145-1 and guide bodies 145-2. For example, each of the guide shafts 145-1 may have a linear rail shape, and the guide shafts 145-1 and the guide bodies 145-2 may be provided singularly, and also in plurality.

The driver 145' is fixedly installed on the support member 113 disposed on a central portion of the base block 110' and provided as a singular member. The driver 143' is connected to the transfer member 144 through the driving shaft 143-2 to forwardly and backwardly transfer the transfer member 144.

Even though the driver 143' is provided singularly, the driver 143' may transfer the transfer member 144 forward and backward. Also, the driver 143' may apply an external force to each of the pair of rotating blocks 120a' and 120b' through the pair of transmission parts 146 connected to the transfer member 144.

The pair of transmission parts 146 described above may transmit the transfer force of the transfer member 144 to each of the pair of rotating blocks 120a' and 120b' by the driver 143' to rotate the pair of rotating blocks 120a' and 120b'.

For this, the pair of transmission parts 146 may include a transmission block 146-1 and an elastic member 146-3.

As shown in FIG. 10, the transmission block 146-1 is connected to the base block 110' through a second elastic body 146-2 and is hinge-connected to the transfer member 144 through a connecting body 146-4 and the elastic member 146-3. Thus, as the transfer force of the transfer member 144 is applied, the transmission block 146-1 is rotated around a second rotating point RP2 at which the base block 110' and the second elastic body 146-2 are connected to each other to apply the external forces to the rotating blocks 120a' and 120b' or to elastically return to its original position.

Originally, to applying the curvature to the mirror 10, the external forces should be applied to the pair of rotating blocks 120a' and 120b' in directions opposite to each other. However, since the transmission block 146-1 is provided, the curvature of the mirror 10 may be adjusted by the external force applied to the transmission block 146-1 in the same direction. As a result, the curvature of the mirror 10 may be adjusted by using the single driver 143'.

Here, the transmission block 146-1 may include a sliding member 146-5 so that the transmission block 146-1 is smoothly slid on the rotating blocks 120a' and 120b' when the transmission block 146-1 applies the external forces to the rotating blocks 120a' and 120b' or elastically returns to its original position, and a distance between each of the rotating blocks 120a' and 120b' and the transmission block 146-1 corresponds to a predetermined design value.

The sliding member 146-5 has a contact portion with a curved surface to contact each of the extending ends of the rotating blocks 120a' and 120b'. Also, the sliding member 146-5 may be freely and rotatably disposed on the transmission block 146-1.

More specifically, in describing that the sliding member 146-5 is configured so that the distance between the transmission block 146-1 and each of the rotating blocks 120a' and 120b' corresponds to the predetermined design value, the rotating blocks 120a' and 120b', the first elastic bodies 121, the transmission block 146-1, and the second elastic body 146-2 may be integrated with the base block 110' through wire electrical discharge machining. In this case, the distance between each of the rotating blocks 120a' and 120b' and the transmission block 146-1 may depend more on the diameter of a wire used for the wire electrical discharge machining than the design value. Thus, the distance between each of the rotating blocks 120a' and 120b' and the transmission block 146-1 may be an inaccuracy.

Here, when the transmission block 146-1 is installed after the sliding member 146-5 is accurately mechanically processed in outer appearance, the distance between the transmission block 146-1 and each of the rotating blocks 120a' and 120b' may be accurately set to correspond to the design value.

Although the sliding member 146-5 is disposed on the transmission block 146-1 in the second embodiment of the present invention, the sliding member 146-5 may be disposed on the extending ends of the rotating blocks 120a' and 120b' adjacent to the transmission block 146-1.

Although the second elastic body 146-2 has a cantilever shape and is integrated with the base block 110' and the transmission block 146-1 in the second embodiment of the present invention, the present invention is not limited thereto. The second elastic body 146-2 may be separately manufactured and thus be fixedly disposed on each of the base block 110' and the transmission block 146-1. Also, the second elastic body 146-2 may not be limited to the shape of the cantilever and may thus be embodied in various shapes.

The elastic member 146-3 may be variable in length through the elastic deformation thereof so that the transmission block 146-1 is slightly rotated even though the transfer member 144 is excessively transferred to reduce the transferred distance of the transfer member 144. As the transferred distance of the transfer member 144, i.e., the magnitude of a force transmitted into the transmission block 146-1 is significantly reduced when compared to the displacement of the transfer member 144, the rotation angle of the transmission block 146-1, more particularly, the rotation angle of each of the rotating blocks 120a' and 120b' and the curvature of the mirror 10 may be minutely adjusted. Thus, the curvature adjustment of the mirror 10 may be improved in accuracy.

For this, the elastic member 146-3 may be provided as an element that is variable in length through the elastic deformation thereof, like a tension spring. The elastic member 146-3 has one end disposed on the transmission block 146-1 through a connecting body 146-4 connected by a hinge HG and the other end connected to a side of the transfer member 144 by a hinge HG.

The elastic member 146-3 may be provided as an element having elasticity different from that of the tension spring. Also, the elastic member 146-3 may be provided in plurality.

The elastic member 146-3 and the connecting body 146-4 may be components for improving the accuracy of adjusting the curvature of the mirror 10 and assemblability. In the curvature adjustment device 100' according to the present invention, the elastic member 146-3 and the connecting body 146-4 are not necessary components.

Although each of the pair of transmission parts 146 includes the transmission block 146-1 disposed on the base block 110' by the second elastic body 146-2 in the second embodiment of the present invention, the transmission parts 146 may be enough to adequately transmit the transfer force to the rotating blocks 120a' and 120b' so that the rotating blocks 120a' and 120b' are rotated by the transfer force of the transfer member 144. Also, the present invention is not limited to the embodied method described above.

As shown in FIG. 10, a displacement sensor 150 is connected to the driving shaft 143-2 of the driver 143' to measure the displacement of the driving shaft 143-2, i.e., the displacement of the transfer member 144.

Since the measured value of the displacement sensor 150, the rotation values of the rotating blocks 120a' and 120b', and the curvature adjustment value of the mirror 10 may be linearly proportional to each other, the measured value of the displacement sensor 150 may be confirmed to operate the drivers 143', thereby adjusting the curvature of the mirror 10.

The displacement sensor 150 may not be essential components in the curvature adjustment device according to the present invention. Different sensors, which may be replaced with the displacement sensor 150, for directly measuring the rotation angles of the rotating blocks 120a' and 120b' may be provided.

Like the curvature adjustment device 100' according to the second embodiment of the present invention, the first rotating points RP1 with respect to the pair of rotating blocks 120a' and 120b' are disposed symmetrical to each other with respect to the central point MC of the mirror 10. In this case, when the curvature of the mirror 10 is adjusted by using the single driver 143', it may be difficult to achieve an elliptical curvature that is required for focusing the electromagnetic waves.

Figure 11:
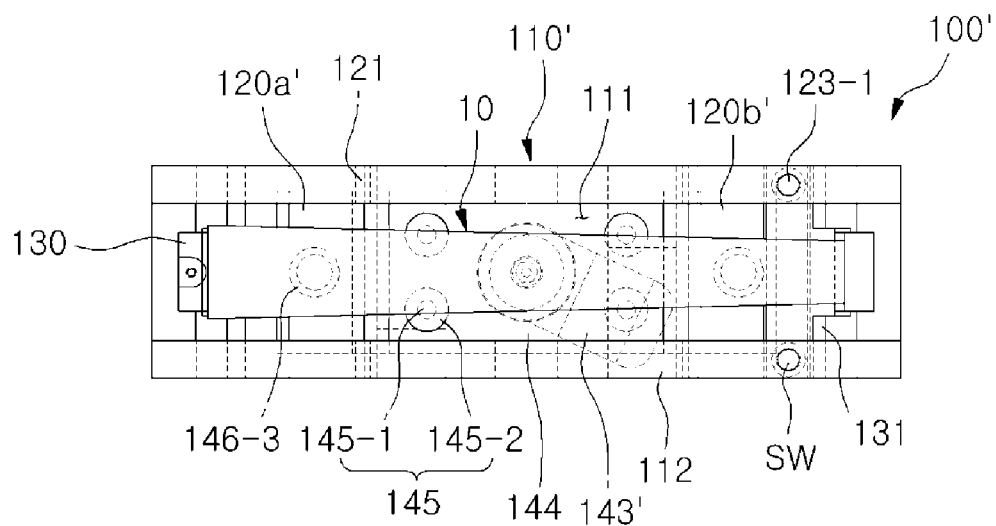
FIG. 11 is a plan view of the device for adjusting the curvature of the mirror according to the second embodiment of the present invention.

Thus, in the case of the second embodiment of the present invention, as shown in FIG. 11, a mirror (width-variable mirror) having a variable width may be preferably used so that the elliptical curvature is deformed when moments having the same magnitude are applied to both ends of the mirror.

If a general mirror having a uniform width is used, it may be preferable that the first rotating points RP1 with respect to the pair of rotating blocks 120a' and 120b' are disposed asymmetrical to each other through structural analysis so that the elliptical curvature is achieved.

Hereinafter, an operation and used state of the curvature adjustment device 100' according to the second embodiment of the present invention will be described in detail on the basis of an order of processes for adjusting the curvature so that the curvature of the mirror 10 is gradually increased.

First, to adjust the curvature of the mirror 10, in the state of FIG. 10, the driver 143' of the driving part 140' is operated to press the transfer member 144 connected to the driving shaft 143-2 upward when viewed in FIG. 13. Thus, the transfer member 144 may be stably guided by the guide part 145 constituted by the guide shaft 145-1 and the guide body 145-2 and then be transferred upward.

As a result, the elastic member 146-3 connected to each of both sides of the transfer member 144 may be elastically deformed by the tensile force, and the transfer force of the transfer member 144 may be transmitted into the transmission block 146-1 in a state where the transfer displacement is reduced. Thus, the second elastic body 146-2 may be elastically deformed to rotate the transmission block 146-1 around the second rotating point RP2.

As described above, when the transfer member 144 ascends, and the transmission block 146-1 is rotated, the positions of the connection portion between the transfer member 144 and the elastic member 146-3 and the connection portion between the connecting body 146-4 and the elastic member 146-3 may be offset in a state where the connection portions are disposed on a straight line. However, since the elastic member 146-3 has both ends respectively connected to the transfer member 144 and the connecting body 146-4 through the hinge HG, even though the positions of the connection portion between the transfer member 144 and the elastic member 146-3 and the connection portion between the connecting body 146-4 and the elastic member 146-3 are offset, the elastic member 146-3 may smoothly perform the above-described operations while being adequately rotated with respect to the transfer member 144 and the connecting body 146-4.

Next, as the transmission block 146-1 is rotated around the second rotating point RP2, the extending ends of the rotating blocks 120a' and 120b' are pressed through the sliding member 146-5. Thus, the first elastic bodies 121 are elastically deformed by the pressing force to rotate the rotating blocks 120a' and 120b' around the first rotating points RP1, respectively. Accordingly, the support block 130 fixedly disposed on the rotating blocks 120a' and 120b' may also be rotated.

Thereafter, when the support block 130 is rotated to apply bending moments to both ends of the mirror 10, the curvature of the mirror 10 is increased in a concave direction.

Here, although the curvature of the mirror 10 is increased in the concave direction, and the central point MC of the mirror 10 is moved downward from both ends of the mirror 10, the downward movement of the central point MC may be offset by the upward movement of the support points SP of both ends of the mirror 10. Thus, the central point MC of the mirror 10 may not be moved with respect to the base block 110, but may be fixed.

Figure 14:
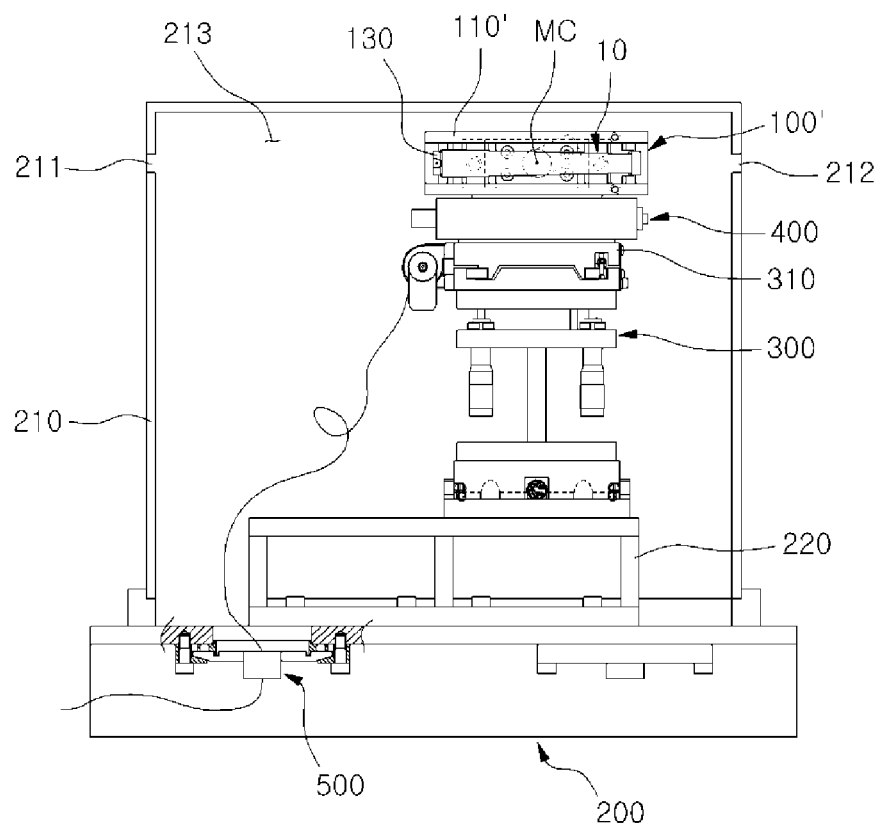
FIG. 14 is a schematic front view of a mirror adjustment system according to the second embodiment of the present invention.

Hereinafter, the mirror adjustment system according to the second embodiment of the present invention will be described in detail with reference to FIG. 14.

The mirror adjustment system according to the second embodiment of the present invention includes a support 200, a position adjustment device 300, an angle adjustment device 400, and the above-described curvature adjustment device 100'.

The support 200 supports other components installed on a bottom surface. A blocking part 210 having a predetermined thickness is disposed on a top surface of the support 200 to form a chamber 213.

The chamber 213 formed by the blocking part 210 may protect the position adjustment device 300, the angle adjustment device 400, and the mirror curvature adjustment device 100, which are disposed therein, from the outside. Also, the chamber 213 may be filled with a helium gas that is an inert gas, or the inside of the chamber 213 may be in a vacuum state to reduce the attenuation of electromagnetic waves due to the atmosphere and delay corrosion on the reflection surface of the mirror 10.

Also, the blocking part 210 has a light incident hole 211 through which the electromagnetic waves are incident onto the mirror 10 and a light emission hole 212 through which the electromagnetic waves reflected by the mirror 10 are emitted. The light incident hole 211 and the light emission hole 212 may be formed by a kapton film or a beryllium window hole.

The position adjustment device 300 is fixedly installed on a top surface of the support 200 within the chamber 213 through a support frame 220 to transfer an installation plate 310 disposed in an upper side in front/rear, left/right, and upward/downward directions. Also, the mirror adjustment system according to the second embodiment of the present invention may adjust front/rear and left/right inclinations of the installation plate 310 by using three drivers which are provided in the position adjustment device 300 to vertically adjust the position of the installation plate 310.

Thus, the angle adjustment device 400, the curvature adjustment device 100', and the mirror 10 which are disposed above the installation plate 310 may be transferred in the front/rear, left/right, and upward/downward directions by the position adjustment device 300 and may also be adjusted in front/rear and left/right inclinations.

The angle adjustment device 400 is fixedly installed on the installation plate 310. Also, a top surface of the angle adjustment device 400 may be adjusted in angle with respect to a bottom surface thereof. Thus, the angle adjustment device 400 adjusts the pitch angle of the curvature adjustment device 100' including the mirror 10, which is disposed on the top surface thereof.

The curvature adjustment device 100' may adjust the curvature of the mirror 10 to focus the electromagnetic waves. Since the specific constitution and operation of the curvature adjustment device 100' are sufficiently described, further detailed descriptions of the mirror adjustment system, which duplicate the descriptions of the curvature adjustment device 100', will be omitted.

The mirror adjustment system may include a feedthrough 500 for connecting cables for controlling the drivers operating the position adjustment device 300, the angle adjustment device 400, and the curvature adjustment device 100' to the inside or outside of the chamber 213.

The process of adjusting the mirror by using the mirror adjustment system will be performed as follows.

First, a process for matching the electromagnetic waves introduced through the light incident hole 211 with the central point MC of the mirror 10 is performed. Since synchrotron radiation is not visible light, and has a very small beam size in this process, the electromagnetic waves passing through the mirror 10 may be measured by using an ionization chamber, and then, a plurality of measured light intensities may be analyzed to confirm the relative position of the mirror 10 with respect to the electromagnetic waves.

Thus, the position adjustment device 300 that can adjust the front/rear, left/right, and up/down positions of the mirror 10 and the inclination of the mirror 10, the angle adjustment device 400 for the pitch angle of the mirror 10, and the above-described ionization chamber may be combined with each other to match the electromagnetic waves incident onto the mirror 10 with the central point MC of the mirror 10.

Thereafter, a process of focusing the electromagnetic waves reflected by the mirror 10 is performed to reduce the beam size. Since the beam size is a function with respect to the pitch angle of the mirror 10 as well as the curvature of the mirror 10, the curvature adjustment device 100' and the angle adjustment device 400 may be alternately and repeatedly used to search for a curvature and a pitch angle for minimizing the beam size, thereby finally minimizing the beam size.

Here, in the mirror adjustment system according to the present invention, since only two input variables with respect to the single driver for adjusting the curvature of the mirror 10 and the driver for adjusting the pitch angle of the mirror 10 are adjusted to focus the electromagnetic waves reflected by the mirror 10, the mirror adjustment system according to the present invention may easily perform the mirror adjustment process when compared to using the existing mirror adjustment system in which three input variables should be controlled.

Here, in the curvature adjustment device 100' according to the present invention, even though the curvature of the mirror 10 is adjusted, since the central point MC of the mirror 10 which is adjusted in position and angle is not moved, but is fixed, it may be unnecessary to perform a process for focusing the electromagnetic waves onto the central point MC of the mirror 10 again, like the existing curvature adjustment device. Thus, the process of adjusting the mirror 10 may be significantly simplified.

Although the mirror adjustment system for the horizontal mirror in which the reflection surface of the mirror 10 is provided as a front surface is described as the mirror adjustment system according to the second embodiment, a mirror adjustment system for a vertical mirror in which the reflection surface of the mirror 10 is provided as a plan surface may be realized through a method similar to the above-described method. In addition, the mirror adjustment system for the vertical mirror may be installed and used together with the mirror adjustment system for the horizontal mirror within the chamber 213 of the mirror adjustment system according to the foregoing second embodiment of the present invention.

As described above, according to the curvature adjustment device 100' according to the present invention and the mirror adjustment system including the same, since the driving part 140' for rotating the pair of rotating blocks 120a' and 120b' to adjust the curvature of the mirror 10 includes the pair of transmission parts 146 and the transfer member 144 and is also provided as a single driver 143', the process of adjusting the curvature of the mirror 10 may be simply performed by adjusting an input with respect to only one driver. In addition, the process of focusing the electromagnetic waves may be easily performed. Since the transfer force of the transfer member 144 by the driver 143' is applied to each of the pair of transmission blocks 146-1 through the pair of elastic members 146-3, the adjustment of the rotation angles of the rotating blocks 120a' and 120b' and the curvature of the mirror 10 may be very accurately performed when compared to the transfer displacement of the transfer member 144. Also, since the first elastic bodies 121 connecting the rotating blocks 120a' and 120b' on which the support blocks 130 are installed to the base block 110' are disposed movable in a direction opposite to the moving direction of the central point MC of the mirror 10 by the change in the curvature when the curvature of the mirror 10 is adjusted, the process of adjusting the curvature of the mirror 10 may be simply and easily performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A device for adjusting the curvature of a mirror by applying bending moments to both ends of the mirror or releasing the bending moments, the device comprising:
   a base block;
   a pair of rotating blocks, each of the pair of rotating blocks being connected to the base block through a first elastic body and being rotated around a connection portion between the base block and the first elastic body or elastically returning to its original position through the application or release of an external force;
   a pair of support blocks which are respectively disposed on the pair of rotating blocks to support both ends of the mirror, the pair of support blocks applying bending moments to both ends of the mirror by the rotation of the pair of rotating blocks; and
   a driving part rotating the pair of rotating blocks, wherein the first elastic body has a cantilever shape, an upper portion of the first elastic body is connected to the base block, a rotating point being the connection portion between the base block and the first elastic body, the connection portion being located at the upper portion of the first elastic body, a lower portion of the first elastic body is connected to the pair of rotating blocks and when viewed from a front side, the rotating point is disposed on the reflection surface of the mirror or at a position adjacent to the reflection surface of the mirror, and wherein
   the first elastic body connects the rotating blocks to the base block so that support points of the support blocks of the mirror are movable in a direction opposite to a moving direction of the central point of the mirror by a change in the curvature of the mirror as the rotating blocks are rotated, wherein the driving part comprises:
   a first leaf spring provided in a pair to rotate each of the pair of rotating blocks, the first leaf spring having one end fixed to the rotating blocks;
   a second leaf spring disposed through a connecting member so that the second leaf spring is fixed at one end to the other end of the first leaf spring in a state where the second leaf spring is spaced a predetermined distance from the first leaf spring and disposed parallel to the first leaf spring; and
   a driver pressing or releasing the other end of the second leaf spring toward the first leaf spring.

2. The device of claim 1, wherein the rotating blocks and the first elastic body are integrated with the base block.

3. The device of claim 1, wherein at least one of the pair of support blocks is disposed on the rotating blocks through a connecting block fixed to be adjustable in position to the rotating blocks.

4. A device for adjusting the curvature of a mirror by applying bending moments to both ends of the mirror or releasing the bending moments, the device comprising:
 a base block;
 a pair of rotating blocks, each of the pair of rotating blocks being connected to the base block through a first elastic body and being rotated around a connection portion between the base block and the first elastic body or elastically returning to its original position through the application or release of an external force;
 a pair of support blocks which are respectively disposed on the pair of rotating blocks to support both ends of the mirror, the pair of support blocks applying bending moments to both ends of the mirror by the rotation of the pair of rotating blocks; and a driving part comprising a transfer member transferred forward or backward in one direction, a single driver transferring the transfer member, and a pair of transmission parts respectively disposed on both ends of the transfer member to transmit a transfer force of the transfer member by the driver to the pair of rotating blocks, thereby rotating each of the pair of rotating blocks, wherein
 the first elastic body has a cantilever shape, an upper portion of the first elastic body is connected to the base block, a rotating point being the connection portion between the base block and the first elastic body, the connection portion being located at the upper portion of the first elastic body, a lower portion of the first elastic body is connected to the pair of rotating blocks and when viewed from a front side, the rotating point is disposed on the reflection surface of the mirror or at a position adjacent to the reflection surface of the mirror, and wherein
 the first elastic body connects the rotating blocks to the base block so that support points of the support blocks of the mirror are movable in a direction opposite to a moving direction of the central point of the mirror by a change in the curvature of the mirror as the rotating blocks are rotated.

5. The device of claim 4, wherein each of the pair of transmission parts comprises a transmission block connected to the base block through a second elastic body, the transmission block being connected to the transfer member through a hinge to rotate around a connection portion between the base block and the second elastic body by applying or releasing the transfer force of the transfer member, thereby applying an external force to the rotating block or elastically returning the rotating block to its original position.

6. The device of claim 5, wherein each of the pair of transmission parts further comprises an elastic member that is variable in length through elastic deformation thereof, and the transmission block is connected to the transfer member through the elastic member.

7. The device of claim 4, wherein the driving part further comprises a guide part comprising at least one guide shaft fixed to the base block along a transfer direction of the transfer member and at least one guide body transferred forward or backward by being respectively engaged with the at least one guide shaft and coupled to the transfer member to guide the forward or backward transfer of the transfer member.

8. The device of claim 5, wherein one of the transmission block and the rotating block comprises a sliding member to smoothly slidably contact the rotating block when the transmission block applies the external force to the rotating block or elastically returns the rotating block to its original position and allow a distance between each of the rotating blocks and the transmission block to correspond to a predetermined design value, the sliding member having a curved contact portion, which contacts the transmission block or rotating block.

9. The device of claim 5, wherein the transmission block and the second elastic body are integrated with the base block.

10. The device of claim 4, wherein the rotating blocks and the first elastic body are integrated with the base block.

11. The device of claim 4, wherein at least one of the pair of support blocks is disposed on the rotating blocks through a connecting block fixed to the rotating blocks to be adjustable in position.

12. A mirror adjustment system for adjusting the position, angle, and curvature of a mirror, the mirror adjustment system comprising:
 a support disposed on a bottom surface;
 a position adjustment device fixedly disposed on the support, the position adjustment device transferring an installation plate in front/rear, left/right, and upward/downward directions and adjusting the inclinations of the installation plate with respect to the support;
 an angle adjustment device fixedly disposed on the installation plate, the angle adjustment device adjusting the rotation angle of a top surface with respect to a bottom surface thereof; and
 a curvature adjustment device comprising a base block disposed on the top surface of the angle adjustment device, a pair of rotating blocks, each of the pair of rotating blocks being connected to the base block through a first elastic body and being rotated around a connection portion between the base block and the first elastic body or elastically returning to its original position through the application or release of an external force, a pair of support blocks which are respectively disposed on the pair of rotating blocks to support both ends of the mirror, the pair of support blocks applying bending moments to both ends of the mirror by the rotation of the pair of rotating blocks, and a driving part rotating the pair of rotating blocks, wherein
 the first elastic body has a cantilever shape, an upper portion of the first elastic body is connected to the base block, a rotating point being the connection portion between the base block and the first elastic body, the connection portion being located at the upper portion of the first elastic body, a lower portion of the first elastic body is connected to the pair of rotating blocks and when viewed from a front side, the rotating point is disposed on the reflection surface of the mirror or at a position adjacent to the reflection surface of the mirror, and wherein
 the first elastic body connects the rotating blocks to the base block so that support points of the support blocks of the mirror are movable in a direction opposite to a moving direction of the central point of the mirror by a change in the curvature of the mirror as the rotating blocks are rotated.

13. A mirror adjustment system for adjusting the position, angle, and curvature of a mirror, the mirror adjustment system comprising:

a support disposed on a bottom surface; a position adjustment device fixedly disposed on the support, the position adjustment device transferring an installation plate in front/rear, left/right, and upward/downward directions and adjusting the inclinations of the installation plate with respect to the support;

an angle adjustment device fixedly disposed on the installation plate, the angle adjustment device adjusting the rotation angle of a top surface with respect to a bottom surface thereof; and a curvature adjustment device comprising a base block disposed on the top surface of the angle adjustment device, a pair of rotating blocks, each of the pair of rotating blocks being connected to the base block through a first elastic body and being rotated around a connection portion between the base block and the first elastic body or elastically returning to its original position through the application or release of an external force, a pair of support blocks which are respectively disposed on the pair of rotating blocks to support both ends of the mirror, the pair of support blocks applying bending moments to both ends of the mirror by the rotation of the pair of rotating blocks, and a driving part rotating the pair of rotating blocks, wherein the driving part comprises a transfer member transferred forward or backward in one direction, a single driver forwardly or backwardly transferring the transfer member, and a pair of transmission parts respectively disposed on both ends of the transfer member to transmit a transfer force of the transfer member by the driver to the pair of rotating blocks, thereby rotating each of the pair of rotating blocks, and the first elastic body connects the rotating blocks to the base block so that support points of the support blocks of the mirror are movable in a direction opposite to a moving direction of the central point of the mirror by a change in the curvature of the mirror as the rotating blocks are rotated, and wherein the first elastic body has a cantilever shape, an upper portion of the first elastic body is connected to the base block, a rotating point being the connection portion between the base block and the first elastic body, the connection portion being located at the upper portion of the first elastic body, and when viewed from a front side, the rotating point is disposed on the reflection surface of the mirror or at a position adjacent to the reflection surface of the mirror.

14. The mirror adjustment system of claim 13, wherein each of the pair of transmission parts comprises a transmission block connected to the base block through a second elastic body, the transmission block being connected to the transfer member through a hinge to rotate around a connection portion between the base block and the second elastic body by applying or releasing the transfer force of the transfer member, thereby applying an external force to the rotating block or elastically returning the rotating block to its original position.

15. The mirror adjustment system of claim 14, wherein each of the pair of transmission parts further comprises an elastic member that is variable in length through elastic deformation thereof, and the transmission block is connected to the transfer member through the elastic member.

* * * * *